US006598167B2

(12) United States Patent
Devine et al.

(10) Patent No.: US 6,598,167 B2
(45) Date of Patent: Jul. 22, 2003

(54) SECURE CUSTOMER INTERFACE FOR WEB BASED DATA MANAGEMENT

(75) Inventors: Carol Y. Devine, Colorado Springs; Gerald A. Shifrin, Monument; Richard W. Shoulberg, Manitou Springs, all of CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,514

(22) Filed: Sep. 24, 1998

(65) Prior Publication Data

US 2003/0041263 A1 Feb. 27, 2003

Related U.S. Application Data

(60) Provisional application No. 60/060,655, filed on Sep. 26, 1997.

(51) Int. Cl.[7] .............................................. G06F 13/00
(52) U.S. Cl. ........................................ 713/201; 709/223
(58) Field of Search ................................ 713/151, 152, 713/153, 165, 166, 168, 191, 193, 200, 201, 202; 709/229, 203, 232, 217, 315, 223; 715/10

(56) References Cited

U.S. PATENT DOCUMENTS

| 4,160,129 A | 7/1979 | Peyser et al. |
| 4,345,315 A | 8/1982 | Cadotte et al. |

(List continued on next page.)

FOREIGN PATENT DOCUMENTS

| EP | 0 809 387 A2 | 5/1997 |
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

*Computer Networks*, Andrew S. Tanenbaum, pp. 410–412.
"XIIR6.3 (Broadway) Overview", http://www.x.org/broadway.htm.
"Stac Unveils Windows NT 4.0 and Web Browser Support in New ReachOut 7" http://www.stac.com/news/pressrel/pr_ro7_unveil.html.
Jainschigg, J., "Billing confirmed: this easy–to–use box turns guest calls into revenue." Teleconnect, vol. 12, No. 9, p. 39 (4).
Biggs, M., "Help for the Web enhances customer support, reduces help desk load" *Inforworld*, Jun. 16, 1997, vol. 19, No. 24, pp. 82+.

(List continued on next page.)

*Primary Examiner*—
*Primary Examiner*—James P. Trammell
*Assistant Examiner*—Pierre Eddy Elisca

(57) ABSTRACT

An integrated series of security protocols is disclosed that protect remote user communications with remote enterprise services, and simultaneously protect the enterprises services from third parties. In the first layer, an implementation of the Secure Sockets Layer (SSL) version of HTTPS provides communications security, including authentication of the enterprise web server and the security of the transmitted data. The protocols provide for an identification of the user, and an authentication of the user to ensure the user is who he/she claims to be and a determination of entitlements that the user may avail themselves of within the enterprise system. Session security is described, particularly as to the differences between a remote user's copper wire connection to a legacy system and a user's remote connection to the enterprise system over a "stateless" public Internet, where each session is a single transmission, rather than an interval of time between logon and logoff, as is customary in legacy systems. Security for the enterprise network and security for the data maintained by the various enterprise applications is also described.

36 Claims, 14 Drawing Sheets

U.S. PATENT DOCUMENTS

| | | | |
|---|---|---|---|
| 4,817,050 A | 3/1989 | Komatsu et al. | |
| 4,893,248 A | 1/1990 | Pitts et al. | |
| 4,972,504 A | 11/1990 | Daniel, Jr. et al. | |
| 5,041,972 A | 8/1991 | Frost | |
| 5,075,771 A | 12/1991 | Hashimoto | |
| 5,131,020 A | 7/1992 | Liebesny et al. | |
| 5,228,076 A | 7/1993 | Hopner et al. | |
| 5,245,533 A | 9/1993 | Marshall | |
| 5,285,494 A | 2/1994 | Sprecher et al. | |
| 5,287,270 A | 2/1994 | Hardy et al. | |
| 5,315,093 A | 5/1994 | Stewart | |
| 5,325,290 A | 6/1994 | Cauffman et al. | |
| 5,327,486 A | 7/1994 | Wolff et al. | |
| 5,369,571 A | 11/1994 | Metts | |
| 5,452,446 A | 9/1995 | Johnson | |
| 5,475,836 A | 12/1995 | Harris et al. | |
| 5,483,596 A | 1/1996 | Rosenow et al. | |
| 5,490,060 A | 2/1996 | Malec et al. | |
| 5,491,779 A | 2/1996 | Bezjian | |
| 5,526,257 A | 6/1996 | Lerner | |
| 5,530,744 A | 6/1996 | Charalambous et al. | |
| 5,537,611 A | 7/1996 | Rajagopal et al. | |
| 5,548,726 A | 8/1996 | Pettus | |
| 5,551,025 A | 8/1996 | O'Reilly et al. | |
| 5,563,805 A | 10/1996 | Arbuckle et al. | |
| 5,586,260 A | 12/1996 | Hu | |
| 5,602,918 A * | 2/1997 | Chen et al. | 380/21 |
| 5,610,915 A | 3/1997 | Elliott et al. | |
| 5,621,727 A | 4/1997 | Vaudreuil | |
| 5,623,601 A | 4/1997 | Vu | |
| 5,630,066 A | 5/1997 | Gosling | |
| 5,649,182 A | 7/1997 | Reitz | |
| 5,666,481 A | 9/1997 | Lewis | |
| 5,671,354 A | 9/1997 | Ito et al. | |
| 5,689,645 A | 11/1997 | Schettler et al. | |
| 5,692,030 A | 11/1997 | Teglovic et al. | |
| 5,696,906 A | 12/1997 | Peters et al. | |
| 5,699,403 A | 12/1997 | Ronnen | |
| 5,699,528 A | 12/1997 | Hogan | |
| 5,706,502 A | 1/1998 | Foley et al. | |
| 5,708,780 A | 1/1998 | Levergood et al. | |
| 5,721,908 A | 2/1998 | Lagarde et al. | |
| 5,721,913 A | 2/1998 | Ackroff et al. | |
| 5,727,129 A | 3/1998 | Barrett et al. | |
| 5,734,709 A | 3/1998 | DeWitt et al. | |
| 5,734,831 A | 3/1998 | Sanders | |
| 5,742,762 A | 4/1998 | Scholl et al. | |
| 5,742,768 A | 4/1998 | Gennaro et al. | |
| 5,742,905 A | 4/1998 | Pepe et al. | |
| 5,745,754 A | 4/1998 | Lagarde et al. | |
| 5,754,830 A | 5/1998 | Butts et al. | |
| 5,764,756 A | 6/1998 | Onweller | |
| 5,768,501 A | 6/1998 | Lewis | |
| 5,774,660 A | 6/1998 | Brendel et al. | |
| 5,778,178 A | 7/1998 | Arunachalam | |
| 5,781,550 A | 7/1998 | Templin et al. | |
| 5,781,632 A | 7/1998 | Odom | |
| 5,787,160 A | 7/1998 | Chaney et al. | |
| 5,787,412 A | 7/1998 | Bosch et al. | |
| 5,790,780 A | 8/1998 | Brichta et al. | |
| 5,790,789 A | 8/1998 | Suarez | |
| 5,790,797 A | 8/1998 | Shimada et al. | |
| 5,790,809 A | 8/1998 | Holmes | |
| 5,793,762 A | 8/1998 | Penners et al. | |
| 5,793,964 A | 8/1998 | Rogers et al. | |
| 5,796,393 A | 8/1998 | MacNaughton et al. | |
| 5,799,154 A | 8/1998 | Kuriyan | |
| 5,802,320 A | 9/1998 | Baehr et al. | |
| 5,805,803 A | 9/1998 | Birrell et al. | |
| 5,812,533 A | 9/1998 | Cox et al. | |
| 5,812,654 A | 9/1998 | Anderson et al. | |
| 5,815,080 A | 9/1998 | Taguchi | |
| 5,815,665 A | 9/1998 | Teper et al. | |
| 5,819,225 A | 10/1998 | Eastwood et al. | |
| 5,819,271 A | 10/1998 | Mahoney et al. | |
| 5,825,769 A | 10/1998 | O'Reilly et al. | |
| 5,826,029 A | 10/1998 | Gore, Jr. et al. | |
| 5,826,269 A | 10/1998 | Hussey | |
| 5,835,084 A | 11/1998 | Bailey et al. | |
| 5,844,896 A | 12/1998 | Marks et al. | |
| 5,845,067 A | 12/1998 | Porter et al. | |
| 5,845,267 A | 12/1998 | Ronen | |
| 5,848,396 A | 12/1998 | Gerace | |
| 5,850,517 A | 12/1998 | Verkler et al. | |
| 5,852,810 A | 12/1998 | Sotiroff et al. | |
| 5,852,812 A | 12/1998 | Reeder | |
| 5,870,558 A | 2/1999 | Branton, Jr. et al. | |
| 5,877,759 A | 3/1999 | Bauer | |
| 5,884,032 A | 3/1999 | Bateman et al. | |
| 5,907,681 A | 5/1999 | Bates et al. | |
| 5,909,679 A | 6/1999 | Hall | |
| 5,909,682 A | 6/1999 | Cowan et al. | |
| 5,915,001 A | 6/1999 | Uppaluru | |
| 5,920,542 A | 7/1999 | Henderson | |
| 5,923,016 A | 7/1999 | Fredregill et al. | |
| 5,930,764 A | 7/1999 | Melchione et al. | |
| 5,930,804 A | 7/1999 | Yu et al. | |
| 5,958,016 A * | 9/1999 | Chang et al. | 709/229 |
| 5,961,602 A | 10/1999 | Thompson et al. | |
| 5,963,925 A | 10/1999 | Kolling et al. | |
| 5,966,695 A | 10/1999 | Melchione et al. | |
| 5,970,467 A | 10/1999 | Alavi | |
| 5,974,396 A | 10/1999 | Anderson et al. | |
| 5,974,441 A | 10/1999 | Rogers et al. | |
| 5,982,864 A | 11/1999 | Jagadish et al. | |
| 5,982,891 A | 11/1999 | Ginter et al. | |
| 5,983,350 A | 11/1999 | Minear et al. | |
| 5,991,733 A | 11/1999 | Aleia et al. | |
| 5,991,806 A | 11/1999 | McHann, Jr. | |
| 5,999,972 A | 12/1999 | Gish | |
| 5,999,973 A | 12/1999 | Glitho et al. | |
| 6,011,844 A | 1/2000 | Uppaluru et al. | |
| 6,014,647 A | 1/2000 | Nizzari et al. | |
| 6,014,702 A | 1/2000 | King et al. | |
| 6,023,762 A | 2/2000 | Dean et al. | |
| 6,031,904 A | 2/2000 | An et al. | |
| 6,032,132 A | 2/2000 | Nelson | |
| 6,032,184 A * | 2/2000 | Cogger et al. | 709/223 |
| 6,041,325 A | 3/2000 | Shah et al. | |
| 6,044,144 A | 3/2000 | Becker et al. | |
| 6,049,602 A | 4/2000 | Foladare et al. | |
| 6,049,789 A | 4/2000 | Frison et al. | |
| 6,058,381 A | 5/2000 | Nelson | |
| 6,064,667 A | 5/2000 | Gisby et al. | |
| 6,065,059 A | 5/2000 | Shieh et al. | |
| 6,073,105 A | 6/2000 | Sutcliffe et al. | |
| 6,073,241 A * | 6/2000 | Rosenberg et al. | 713/201 |
| 6,078,891 A | 6/2000 | Riordan et al. | |
| 6,078,924 A | 6/2000 | Ainsbury et al. | |
| 6,085,171 A | 7/2000 | Leonard | |
| 6,085,190 A | 7/2000 | Sakata | |
| 6,091,808 A | 7/2000 | Wood et al. | |
| 6,094,655 A | 7/2000 | Rogers et al. | |
| 6,115,040 A * | 9/2000 | Bladow et al. | 709/203 |
| 6,115,458 A | 9/2000 | Taskett | |
| 6,115,693 A | 9/2000 | McDonough et al. | |
| 6,119,109 A | 9/2000 | Muratani et al. | |
| 6,131,095 A | 10/2000 | Low et al. | |
| 6,134,584 A | 10/2000 | Chang et al. | |
| 6,145,001 A | 11/2000 | Scholl et al. | |
| 6,163,597 A | 12/2000 | Voit | |

| | | |
|---|---|---|
| 6,182,113 B1 | 1/2001 | Narayanaswami |
| 6,212,506 B1 | 4/2001 | Shah et al. |
| 2001/0003828 A1 | 1/2001 | Peterson |

OTHER PUBLICATIONS

Burch, B., "AT&T, MCI to release new management tools", *Network World*, Jan. 17, 1994, p. 19.

Low, C., "Integrating Communicatiion Services", *IEEE Communication Magazine*, Jun. 1997, pp. 164–169.

"McAfee's New Self–Service Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M., "MCI to Pilot Convergence Billing Service", *InfoWorld*, vol. 18, Issue 37, Sep. 1996.

Yager, T., "Mixed Messages", *UNIX Review*, vol. 16, No. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, Edge, Oct. 2, 1995, on & about AT&T, vol. 10, No. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378, 594, 599, 630–632 (13).

"Crypotography and the Internet", www.echonyc.com/~ysue/crypt.htm,. 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

* cited by examiner

SECURE CUSTOMER INTERFACE FOR WEB BASED DATA MANAGEMENT

CROSS-REFERENCE TO RELATED APPLICATIONS

The following patent application claims the benefit of U.S. Provisional Patent Application Ser. No. 60/060,655, filed Sep. 26, 1997, entitled INTEGRATED CUSTOMER INTERFACE SYSTEM FOR COMMUNICATIONS MANAGEMENT.

BACKGROUND OF THE INVENTION

1. Field of the Invention

The present invention relates in general to computer software, and more particularly to a security methodology for connecting users to an enterprise network or extranet over the public Internet.

2. Background Art

In conventional remote connect computer systems, a connection is made with a large legacy system via a dial-up connection from a customer owned terminal, personal computer or workstation. This connection frequently, although not always, is a fixed copper connection through one or more telco central offices and emulates a terminal addressable by the legacy systems and employs a security methodology dictated by the legacy system. The dial-up access requires custom hardware for a terminal or custom software for a workstation to provide a remote connection. This includes dial-up services, communication services, emulation and/or translation services and generally some resident custom form of the legacy application to interface with the midrange or mainframe computer running the legacy system.

There are several problems associated with the approach. First, the aforementioned software is very hardware dependent, requiring multiple versions of software compatible with each of a wide range of workstations customers generally have. In addition, an extensive inventory of both software and user manuals for distribution to the outside customers is required if an enterprise desires to make its resources available to its customers. Moreover, installing the software generally requires an intensive effort on the customer and the software support team before any reliable and secure sessions are possible.

Secondly, dial-up, modem, and communications software interact with each other in many ways which are not always predictable to a custom application, requiring extensive trouble shooting and problem solving for an enterprise desiring to make the legacy system available to the customer, particularly where various telephone exchanges, dialing standards or signal standards are involved.

Thirdly, although businesses are beginning to turn to the Internet to improve customer service and lower costs by providing Web-based support systems, when an enterprise desires to make more than one system available to the customer, the custom application for one legacy system is not able to connect to a different legacy system, and the customer must generally logoff, logon and re-authenticate to switch from one to the other. The security and entitlement features of the various legacy systems may be completely different, and vary from system to system and platform to platform. The security methodology used by the two legacy systems may be different, requiring different logon interfaces, user or enterprise IDs and passwords. Different machine level languages may be used by the two systems, as for example, the 96 character EBCDIC language used by IBM, and 127 ASCII character language used by contemporary personal computers.

It is therefore desired to provide customers with secure remote connectivity to enterprise legacy systems over the public Internet. The public Internet provides access connectivity world wide via the TCP/IP protocol, without need to navigate various disparate security protocols, telephone exchanges, dialing standards or signal standards, thereby providing a measure of platform independence for the customer.

As contemplated with the present invention the customer can run their own Internet Web browser and utilize their own platform connection to the Internet to enable services. This resolves many of the platform hardware and connectivity issues in the customers favor, and leaves the choice of platform and operating system to the customer. Web-based programs can minimize the need for training and support since they utilize existing client software which the user has already installed and already knows how to use. Further, if the customer later changes that platform, then, as soon as the new platform is Internet enabled, service is restored to the customer. The connectivity and communications software burden is thus resolved in favor of standard and readily available hardware and the browser and software used by the public Internet connection.

Secure World Wide Web (Web)-based online systems are now starting to emerge, generally using security protocols supplied by the browser or database vendors. These Web-based online systems usually employ HTTPS and a Web browser having Secure Sockets Layer (SSL) encryption, and they display Hypertext Markup Language (HTML) pages as a graphical user interface (GUI), and often include Java applets and Common Gateway Interface (CGI) programs for customer interaction.

For the enterprise, the use of off-the-shelf Web browsers by the customer significantly simplifies the enterprise burden. Software development and support resources are available for the delivery of the enterprise legacy services and are not consumed by a need for customer support at the workstation level.

However, the use of the public Internet also introduces new security considerations not present in existing copper wire connections, as an open system increases the exposure to IP hijackers, sniffers and various types of spoofers that attempt to collect user id's and passwords, and exposes the availability of the service to the users when the system is assaulted by syn-flooding, war dialers or ping attacks. These measures also need to be combined with traditional security measures used to prevent traditional hacker attacks, whether by copper wire or the internet, that might compromise the enterprise system and its data.

SUMMARY OF THE INVENTION

The present invention is directed to a series of security protocols and an integrated system for the same that enables a user to interact with one or more application services provided by remote servers over the public Internet, or an enterprise extranet. The present invention utilizes the Web paradigm and an integrated graphical user interface to allow easy and convenient access from the user's perspective, wherein the security provisions are transparent to the user, other than the entry of a customary user id and a strong password.

In order to provide cross-platform software operability that is not dependent on a specific operating system or hardware, the present invention is implemented using programming languages, such as Java™ which only requires a Java™ enabled Web browser. The system of the present invention includes an application backplane unit for controlling and managing the overall user interface system to a number of Web enabled application services, and a common security object for managing security and Java™ applets for a number of disparate services available from the remote servers.

Each remote service includes its own user interface unit, referred heretofore as a client application, independently implemented of one another and the backplane. Although the client applications are independently developed as separate modules, the system of the present invention provides a capability of integrating the client applications and secured access thereto into one unified system, allowing users to access the individual client applications via the backplane unit and the security object.

The present invention includes centralized user authentication to insure that the user has valid access to the system. The authentication procedure generally includes a logon object which prompts for and accepts the user's name and password. The logon object then communicates the logon transaction to a remote server responsible for screening those users attempting to access remote services. Once a user has been authenticated by the system of the present invention, the user need not re-enter their name and password each time the user accesses another remote server via the respective server's user interface program. In addition, each application may supplement the provided authentication procedure, with its own method of authentication by communicating with its respective servers independently.

Once a validated user is logged onto the system, the user is presented with a set of remote services which the user may obtain. The set of remote services available for each user is unique and depends on each user's subscriptions to the services. The set of service subscription, then forms the user's entitlements for the services. Thus, for example, if a user subscribes to a toll free network management service, the user is entitled to access information regarding the service. On the other hand, if the user does not subscribe to the toll free network manager service, that option is not available for the user to select.

The present invention includes a user object to represent a current user logged onto the system. This user object, inter alia, is responsible for obtaining from a remote server the current user's information including the user's entitlements to various remote services. The backplane uses the entitlement information to provide only those services available to the user. As explained previously, the backplane will not enable the services to which the user does not have entitlements, effectually blocking the user from accessing those services.

In addition, the user information is maintained for the duration of a logon session, allowing both the backplane and the client applications to access the information as needed throughout the duration of the session. The backplane and the client applications use the information to selectively provide remote services to users. Accordingly, it is yet another object of the present invention to provide a mechanism for retrieving and maintaining user information and entitlements such that they are available to processes and threads running on the client platform without having to communicate with a remote server every time the information is needed.

The system of the present invention implements a "keep alive message" passed between a client and a server, also called a "heartbeat." For example, a keep alive message is sent every predefined period, e.g., 1 minute from a client application to the server. When the client application fails to heartbeat consecutively for a predetermined period of time, for example, one hour, the server treats this client application as having exited by closing the application and performing cleanup routines associated with the application. This mechanism assists in restricting authorized access by effectively preventing sessions from remaining open in the event of client application failure or user neglect. Accordingly, it is a further object of the present invention to provide a mechanism for detecting communication failures among the "stateless" processes running the present invention.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENTS

The present invention is directed to a series of security protocols and procedures used to protect an integrated system that enables a user to interact with one or more enterprise applications provided by remote servers over the public Internet, or an enterprise extranet. The present invention utilizes the Web paradigm and an integrated graphical user interface to allow easy and convenient access from the user's perspective, wherein the security provisions are transparent to the user, other than the entry of a customary user id and a strong password.

The discussion of the present invention will include an overview of the system in which the various security protocols function and detailed discussions of Communications Security, User Identification and Authentication, Session Security, Enterprise Security and Application security.

Communications security relates to the authenticity of the enterprise web server and the security of the transmitted data through an implementation of the Secure Sockets Layer (SSL) version of HTTPS.

User Identification and Authentication relates to an identification of the user, an authentication of the user to ensure the user is who he/she claims to be and a determination of entitlements that the user may avail themselves of within the enterprise system.

Session Security is directed to the differences between a remote user's copper wire connection to a legacy system and a user's remote connection to the enterprise system over a "stateless" public Internet, where each session is a single transmission, rather than an interval of time between logon and logoff, as is customary in legacy systems.

Enterprise Security is directed to the security of the enterprise network and the data maintained by the various enterprise applications with respect to attacks on the system or data.

Architectural Overview of The Web-enabled System

The web-enabled system in which the present security protocols are found is basically organized as a set of common components which together are known as networkMCI Interact, which includes the following major components:

1) an object oriented software architecture detailing the client and server based aspects of networkMCI Interact;
2) a network architecture defining the physical network needed to satisfy the security and data volume requirements of networkMCI Interact;
3) a data architecture detailing the application, back-end or legacy data sources available for networkMCI Interact; and,
4) an infrastructure covering security, order entry, fulfillment, billing, self-monitoring, metrics and support.

Each of these common component areas will be generally discussed hereinbelow. A detailed description of each of these components can be found in a related, co-pending U.S. patent application Ser. No. 09/159,695 (Attorney Docket 11038) entitled INTEGRATED CUSTOMER INTERFACE SYSTEM FOR COMMUNICATIONS NETWORK MANAGEMENT, the disclosure of which is incorporated herein by reference thereto.

Figure 1:
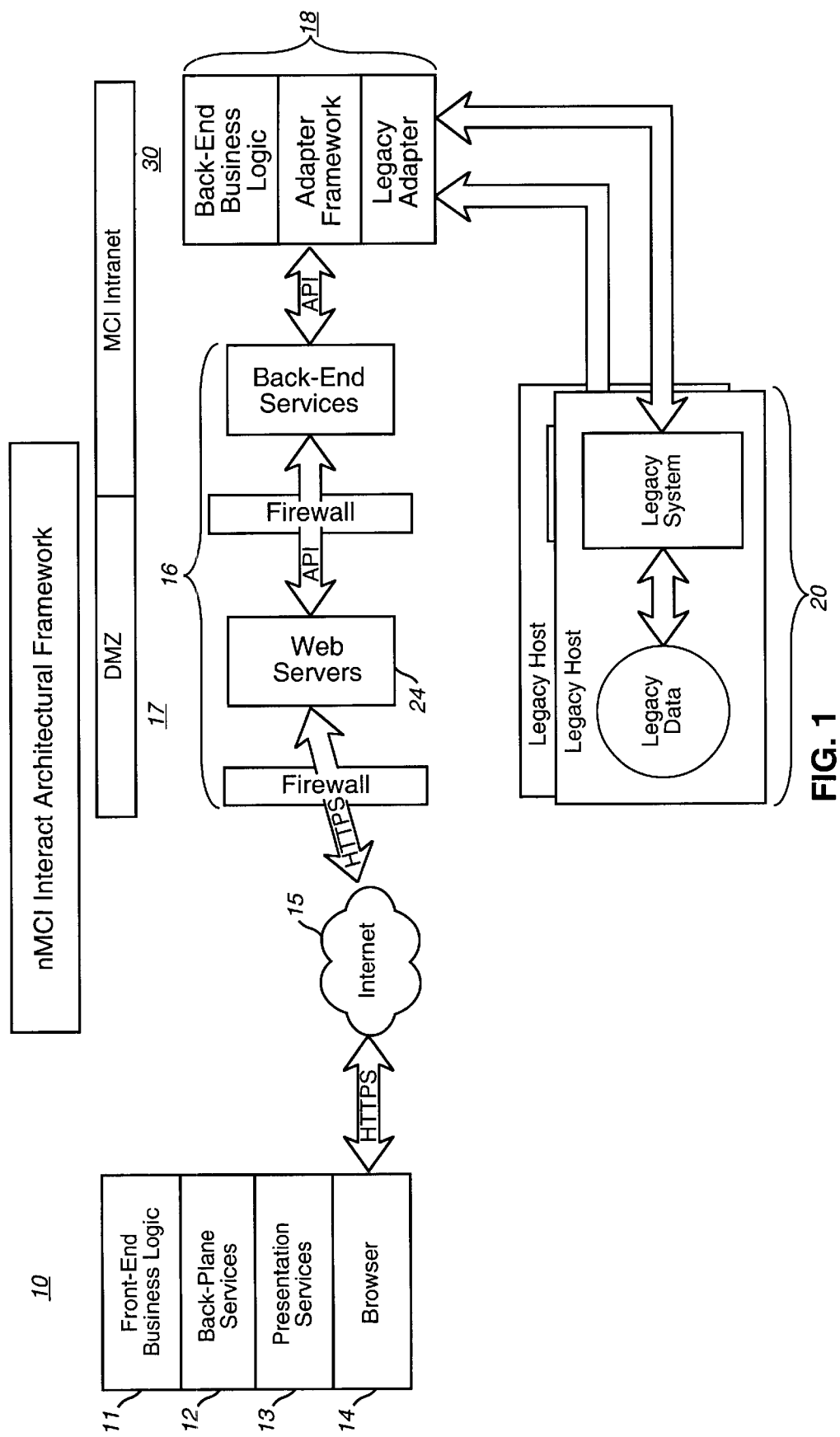
FIG. 1 is a diagrammatic overview of the architectural framework of an enterprise internet network system.

FIG. 1 is a diagrammatic illustration of the software architecture in which the present invention functions. A first tier of software services are resident on a customer work station 10 and provides customer access to the enterprise system, having one or more downloadable application objects directed to front end business logic as indicated at 11, one or more backplane service objects 12 for managing sessions, one or more presentation services objects 13 for the presentation of customer options and customer requested data in a browser recognizable format and a customer supplied browser 14 and operating system environment for presentation of customer options and data to the customer and for internet communications over the public Internet.

A second or middle tier 16 is provided, having secure web servers 24 and back end services to provide applications that establish user sessions, govern user authentication and their entitlements, and communicate with adaptor programs to simplify the interchange of data across the network.

A back end or third tier 18 having applications directed to legacy back end services includes database storage and retrieval systems and one or more database servers for accessing system resources from one or more legacy systems 20.

Generally, as explained in U.S. patent application Ser. No. 09/159,515 (Attorney Docket 11040), entitled GRAPHICAL USER INTERFACE FOR WEB ENABLED APPLICATIONS, now U.S. Pat. No. 6,115,040, the disclosure of which is incorporated herein by reference thereto, the customer workstation 10 includes client software capable of providing a platform-independent, browser-based, consistent user interface implementing objects programmed to provide a reusable and common GUI and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, Toll Free Network Manager or Broadband Manager functions. The system is capable of delivering to customers the functionality appropriate to their product mix.

Figure 4:
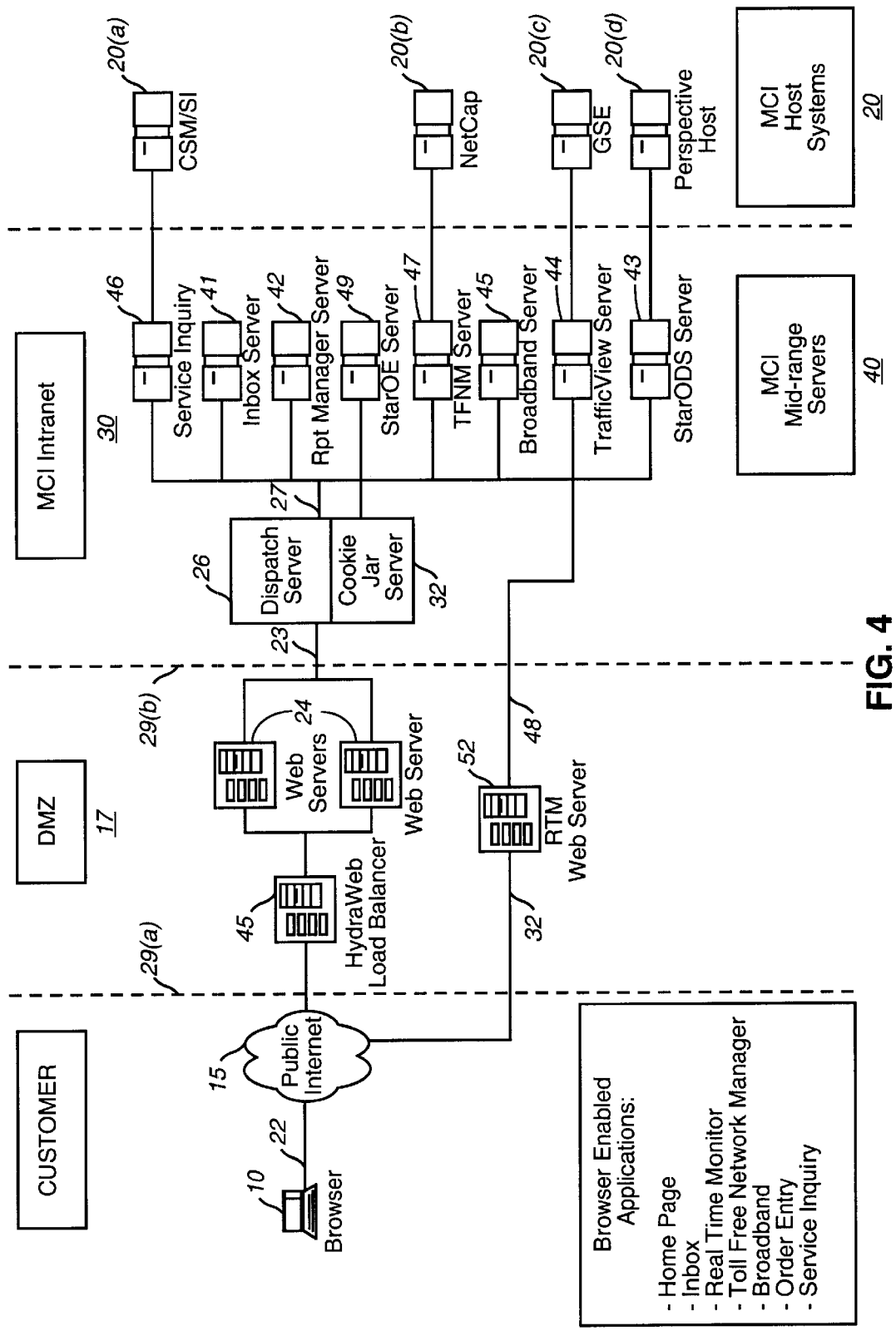
FIG. 4 is a diagrammatic overview of the software architecture of the enterprise internet network system.

FIG. 4 is a diagrammatic illustration of the network and platform components of the networkMCI Interact system, including: the Customer workstation 10; the Demilitarized Zone 17 (DMZ); a cluster of Web Servers 24; the MCI Dispatcher Server 26; the MCI application servers 40, and the legacy systems 20.

Figure 2:
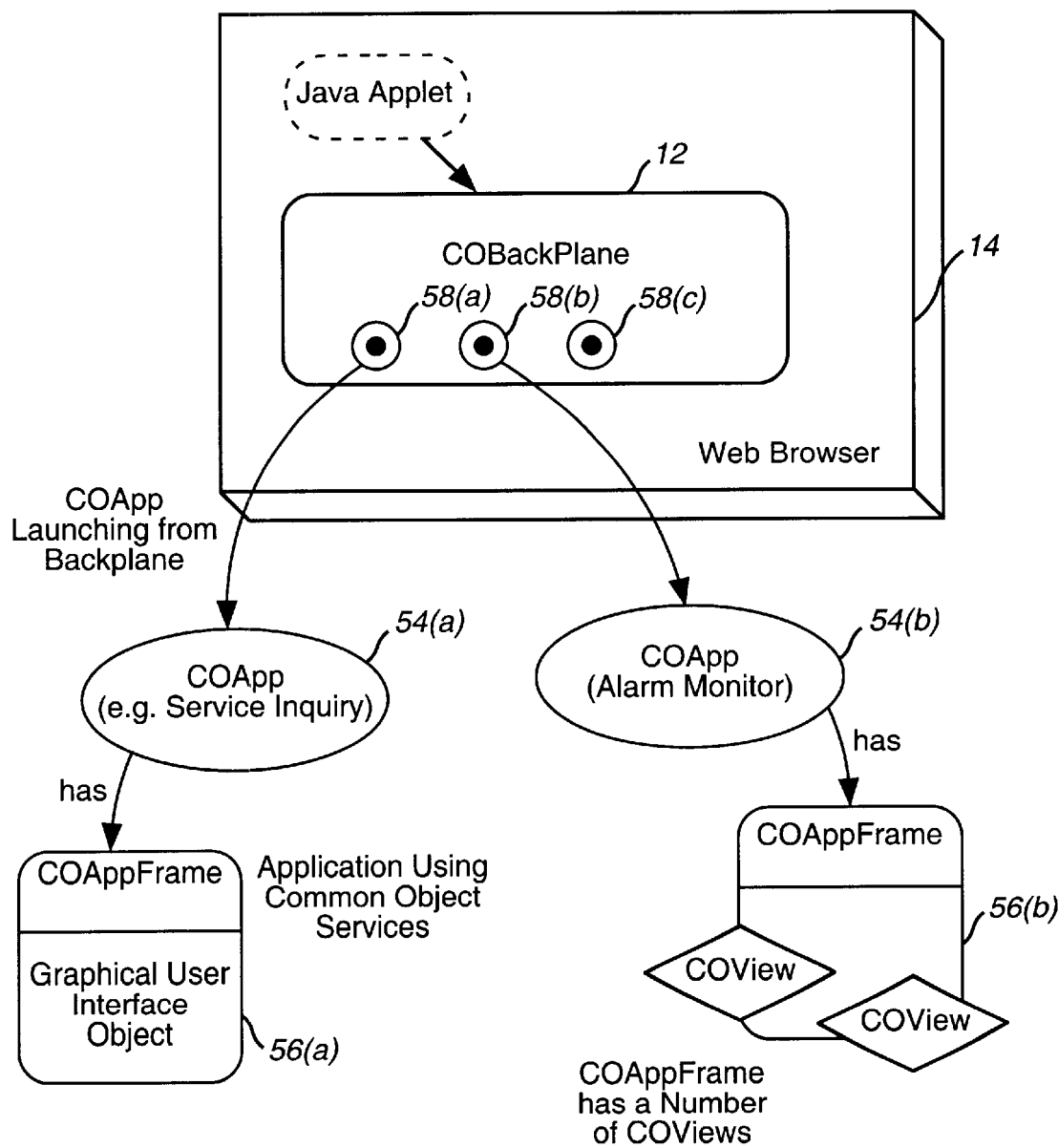
FIG. 2 is an illustrative example of a backplane architecture schematic as invoked from a home page of the present system.

The customer workstation 10 is browser enabled and includes client applications responsible for presentation and front-end services. Its functions include providing a user interface to various MCI services and supporting communications with MCI's Intranet web server cluster 24. As illustrated in FIG. 2, and more specifically described in the above-referenced co-pending U.S. Patent Application GRAPHICAL USER INTERFACE FOR WEB ENABLED APPLICATIONS, the client tier software is responsible for presentation services to the customer and generally includes a web browser 14 and additional object-oriented programs residing in the client workstation platform 10. The client software is generally organized into a component architecture with each component generally comprising a specific application, providing an area of functionality. The applications generally are integrated using a "backplane" services layer 12 which provides a set of services to the application objects which provide the front end business logic 11 and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 2 is an diagrammatic example of a backplane architecture scheme illustrating the relationship among the common objects. In this example, the backplane services layer 12 is programmed as a Java applet which can be loaded and launched by the web browser 14. With reference to FIG. 2, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 2 as buttons 58a,b,c selectable by the user. As illustrated in FIG. 2, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 2 shows graphical user interface objects 56a,b created and used by a respective application 54a,b for its own presentation purposes.

Figure 3:
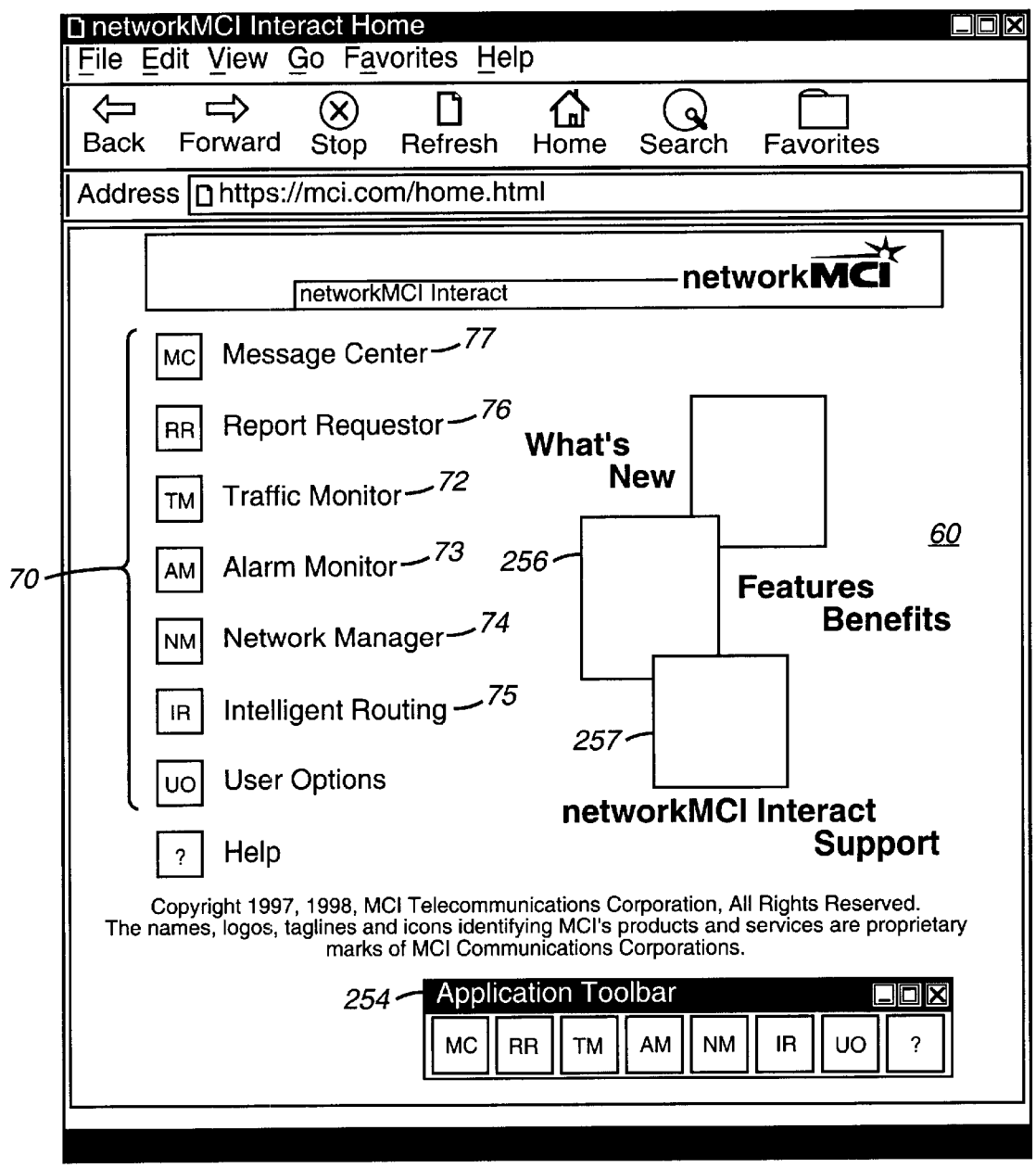
FIG. 3 illustrates an example client GUI presented to the client/customer as a browser Web page.

FIG. 3 illustrates an example client GUI presented to the client/customer as a browser web page 60 providing, for example, a suite 70 of network management applications, which may include: Traffic Monitor 72; an Alarm Monitor 73; a Network Manager 74 and Intelligent Routing 75. Access to network functionality is also provided through Report Requester 76, which provides the ability to define and request a variety of reports for the client/customer and a Message Center 77 for providing enhancements and functionality to traditional e-mail communications by providing access to user requested reports and bulk data. Additional network MCI Internet applications not illustrated in FIG. 3 include Online Invoice, relating to electronic invoicing and Service Inquiry related to Trouble Ticket Management.

As shown in FIGS. 2 and 3, the browser resident GUI of the present invention implements a single object, COBack-Plane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods unit( ), start( ), stop( ) and run( ). In the unit( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above referenced copending application GRAPHICAL USER INTERFACE FOR WEB ENABLED APPLICATIONS, and Appendix A, attached to that application, provides descriptions for the common objects which includes various classes and interfaces with their properties and methods.

As shown in FIG. 4, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second secure socket connection 23 to the dispatcher server 26 inside the enterprise Intranet.

As will be hereinafter described in greater detail, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The present invention is implemented with a secure version of HTTP such as S-HTTP or HTTPS, and presently utilizes the SSL implementation of HTTPS. The present embodiment uses SSL which provides a cipher spec message which provides server authentication during a session. The preferred embodiment further associates a given HTTPS request with a logical session which is initiated and tracked by a "cookie jar server" 32 to generate a "cookie" or session identifier which is a unique server-generated key that is sent to the client along with each reply to a HTTPS request. The client holds the cookie or session identifier and returns it to the server as part of each subsequent HTTPS request. As desired, either the Web servers 24, the cookie jar server 32 or the Dispatcher Server 26, may maintain the "cookie jar" to map the session identifier to the associated session. A separate cookie jar server 32, as illustrated in FIG. 4 has been found desirable to minimize the load on the dispatcher server 26. A new cookie will be generated when the response to the HTTPS request is sent to the client. This form of session management also functions as an authentication of each HTTPS request, adding an additional level of security to the overall process.

Figure 9:
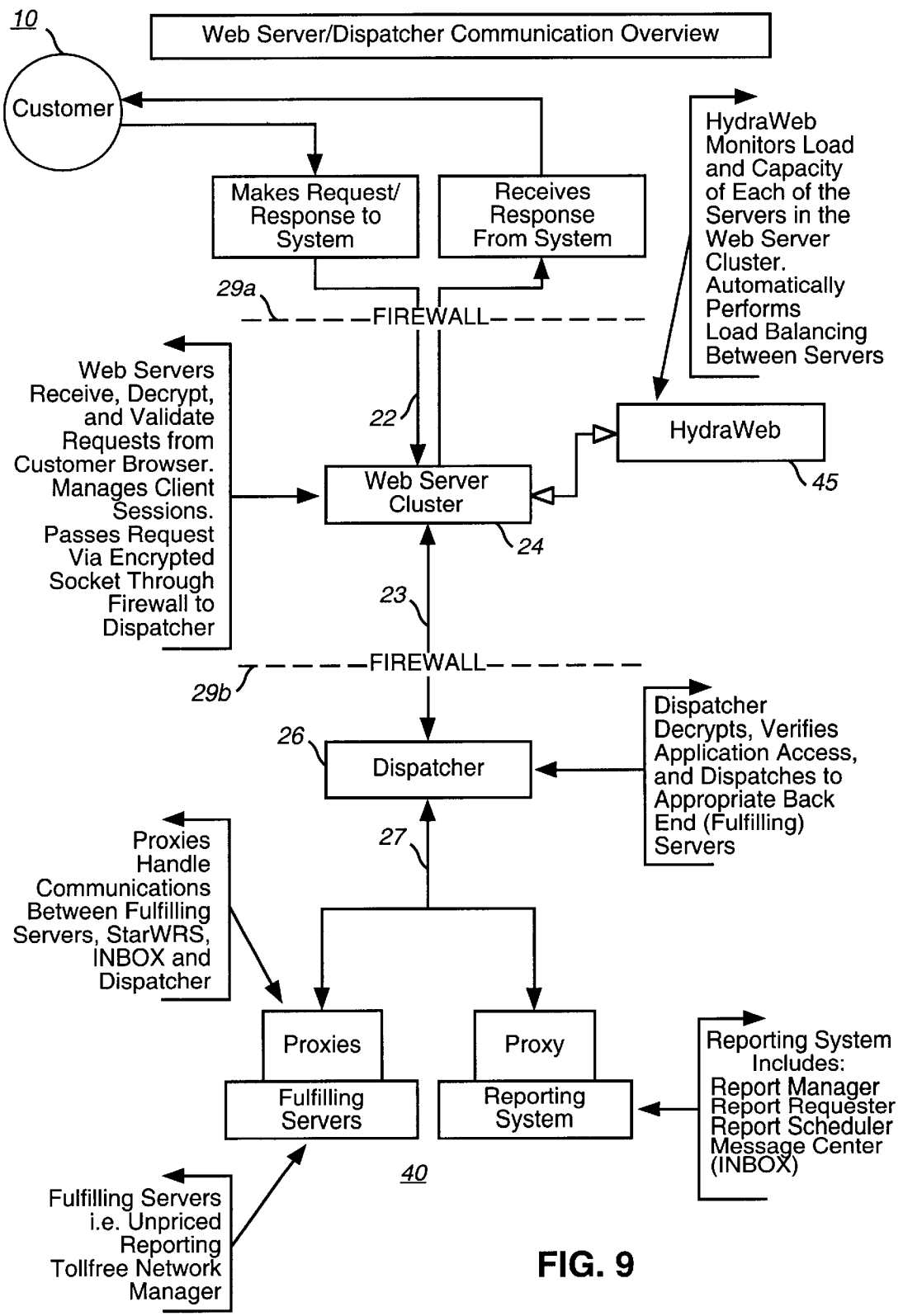
FIG. 9 is a high head functional overview of the communications and encryption protocols between the web server and the Dispatcher server.

As illustrated in FIGS. 4 and 9, after one of the DMZ Web servers 24 decrypts and verifies the user session, it forwards the message through a firewall 29b over a TCP/IP connection 23 to the dispatcher server 26 on a new TCP socket while the original socket 22 from the browser is blocking, waiting for a response. The dispatcher server 26 will unwrap an outer protocol layer of the message from the DMZ servicer cluster 24, and will reencrypt the message with a different encryption key and forward the message to an appropriate application proxy via a third TCP/IP socket 27. While waiting for the proxy response all three of the sockets 22, 23, 27 will be blocking on a receive. While either symmetric or public key encryption can be used, in the preferred embodiment, public key encryption is utilized, with the "public" keys used between components of the network, kept secret. A different public key may be employed for communicating between the dispatcher 26 to the webservers 24 than is used from the webserver 24 to the dispatcher 26. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatcher server 26 from StarOE server 49 at logon time and cached.

If the requestor is authorized to communicate with the target service, the message is forwarded to the desired service's proxy. Each application proxy is an application specific daemon which resides on a specific Intranet server, shown in FIGS. 4 and 9 as a suite of mid-range servers 40. Each Intranet application server of suite 40(*a*) is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 4 may also include a variety of application specific proxies having associated Intranet application servers including: a StarOE proxy for the StarOE application server 49 for handling authentication order entry/billing; an Inbox proxy for the Inbox application server 41, which functions as a container for completed reports, call detail data and marketing news messages, a Report Manager Proxy capable of communicating with a system-specific Report Manager server 42 for generating, managing and scheduling the transmission of customized reports including, for example: call usage analysis information provided from the StarODS server 43; network traffic analysis/monitor information provided from the Traffic view server 44; virtual data network alarms and performance reports provided by Broadband server 45; trouble tickets for switching, transmission and traffic faults provided by Service Inquiry server 46; and toll free routing information provided by Toll Free Network Manager server 47.

As partially shown in FIG. 4, it is understood that each mid-range server of suite 40 communicates with one or several consolidated network databases which include each customer's network management information and data. In the present invention the Services Inquiry server 46 includes communication with MCI's Customer Service Management legacy platform 20(*a*). Such network management and customer network data is additionally accessible by authorized MCI management personnel. As shown in FIG. 4, other legacy or host platforms 20(*b*), 20(*c*) and 20(*d*) may also communicate individually with the Intranet servers for servicing specific transactions initiated at the client browser.

The illustrated host platforms 20(*a*)–(*d*) are illustrative only and it is understood other host platforms may be interpreted into the network architecture illustrated in FIG. 4 through an intermediate midrange server 40.

Each of the individual proxies may be maintained on the dispatcher server 26, the related application server, or a separate proxy server situated between the dispatcher server 26 and the midrange server 40. The relevant proxy waits for requests from an application client running on the customer's workstation 10 and then services the request, either by handling them internally or forwarding them to its associated Intranet application server 40. The proxies additionally receive appropriate responses back from an Intranet application server 40. Any data returned from the Intranet application server 40 is translated back to client format, and returned over the internet to the client workstation 10 via the Dispatcher Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the user to resume a transfer at a later point in time.

The DMZ Web servers 24 are found in a special secure network area set aside from the Intranet to prevent potentially hostile customer access. All DMZ equipment is physically isolated and firewalled as illustrated at 29(*a*), 29(*b*) in FIGS. 1, 4, 5 and 9 from the company Intranet. Similarly, the DMZ equipment is firewalled and obscured from hostile attacks from the public Internet, except for limited web browser access to the web servers which are located in the DMZ. The customer's web browser connects to a web server in the DMZ which in turn connects to the Dispatcher server 26 which acts as a proxy to extract select information from midrange servers 40 located in the company Intranet. A user may not directly connect to any enterprise server in the enterprise intranet, thus ensuring internal company system security and integrity.

The DMZ also isolates the company Intranet from the public Internet because the web servers 24 located in the DMZ never store or compute actual customer sensitive data. The web servers only put the data into a form suitable for display by the customer's web browser. Since the DMZ web servers 24 do not store customer data, there is a much smaller chance of any customer information being jeopardized in case of a security breach.

All reporting is provided through the Message Center (Inbox) and a Report Requestor application which supports spreadsheets, a variety of graph and chart types, or both simultaneously. For example, the spreadsheet presentation allows for sorting by any arbitrary set of columns. The report viewer may also be launched from the Message Center (Inbox) when a report is selected.

By associating each set of report data which is downloaded via the inbox with a small report description object, it is possible to present most reports without report-specific presentation code (the report-specific code is in the construction of the description object). These description objects are referred to as "metadata," or "data about data." At one level, they function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels. This further enhances the security for the customer data, for without the meta-data associated with the report, the report data is essentially a meaningless block of data.

Communications Security

Communications security, which relates to the authenticity of the enterprise web server and the security of the transmitted data will be described with respect to an implementation in the preferred embodiment of the invention of the Secure Sockets Layer (SSL) version of HTTPS.

In order for a communication to be secure, it must be known that the message comes from the correct source, that it arrives at the correct destination, that it has not been modified, and has not been intercepted and understood by a third party. Normal encryption protects against understanding the message, even if intercepted, and certain types of cipher encryption provide the ability to determine that the message has been tampered with and in some cases reconstruct the message even if intercepted and intentionally garbled. The disadvantage of normal encryption is the difficulty associated with the secure distribution and updates of the keys used for encryption and decryption.

Public key encryption solves the distribution and update problem, but does not, for the public Internet, ensure the identity of the party with whom one is communicating. A spoofer who appropriates the DNS address of an enterprise for a leg of the Internet can substitute the spoofers public key for the public key of the enterprise with whom the user is attempting to communicate, thereby fooling the user into revealing the user name and password used on the enterprise system. To avoid this problem, digital signatures have been developed to ensure the identity of the sender. They also, simultaneously, commit the sender to the message, avoiding subsequent repudiation.

The communications link between the enterprise and the user may be secured with S-HTTP, HTTPS, or proprietary encryption methodologies, such as VNP or PPTP tunneling, but in the present embodiment utilizes the Secure Sockets Layer (SSL) protocol developed by Netscape Communications. It is noted that these solutions are intended for use with IPv4, and that Ipv6, presently under comment by the Internet Engineering Steering Group, may enable secure transmissions between client and server without resort to proprietary protocols. The remaining security protocols of the present invention may be used with Ipv6 when it becomes an available standard for secure IP communications.

The SSL component of the HTTPS also includes non-repudiation techniques to guarantee that a message originating from a source is the actual identified sender. One technique employed to combat repudiation includes use of an audit trail with electronically signed one-way message digests included with each transaction. This technique employs SSL public-key cryptography with one-way hashing functions.

Another communications issue involving the secure communications link, is the trust associated with allowing the download of the Java common objects used by the present invention, as discussed earlier with respect to the browser, since the Java objects used in the present invention require that the user authorize disk and I/O access by the Java object.

Digital Certificates, such as those developed by VeriSign, Inc. entitled Verisign Digital ID™ provide a means to simultaneously verify the server to the user, and to verify the source of the Java object to be downloaded as a trusted source as will hereinafter be described in greater detail.

Figure 10:
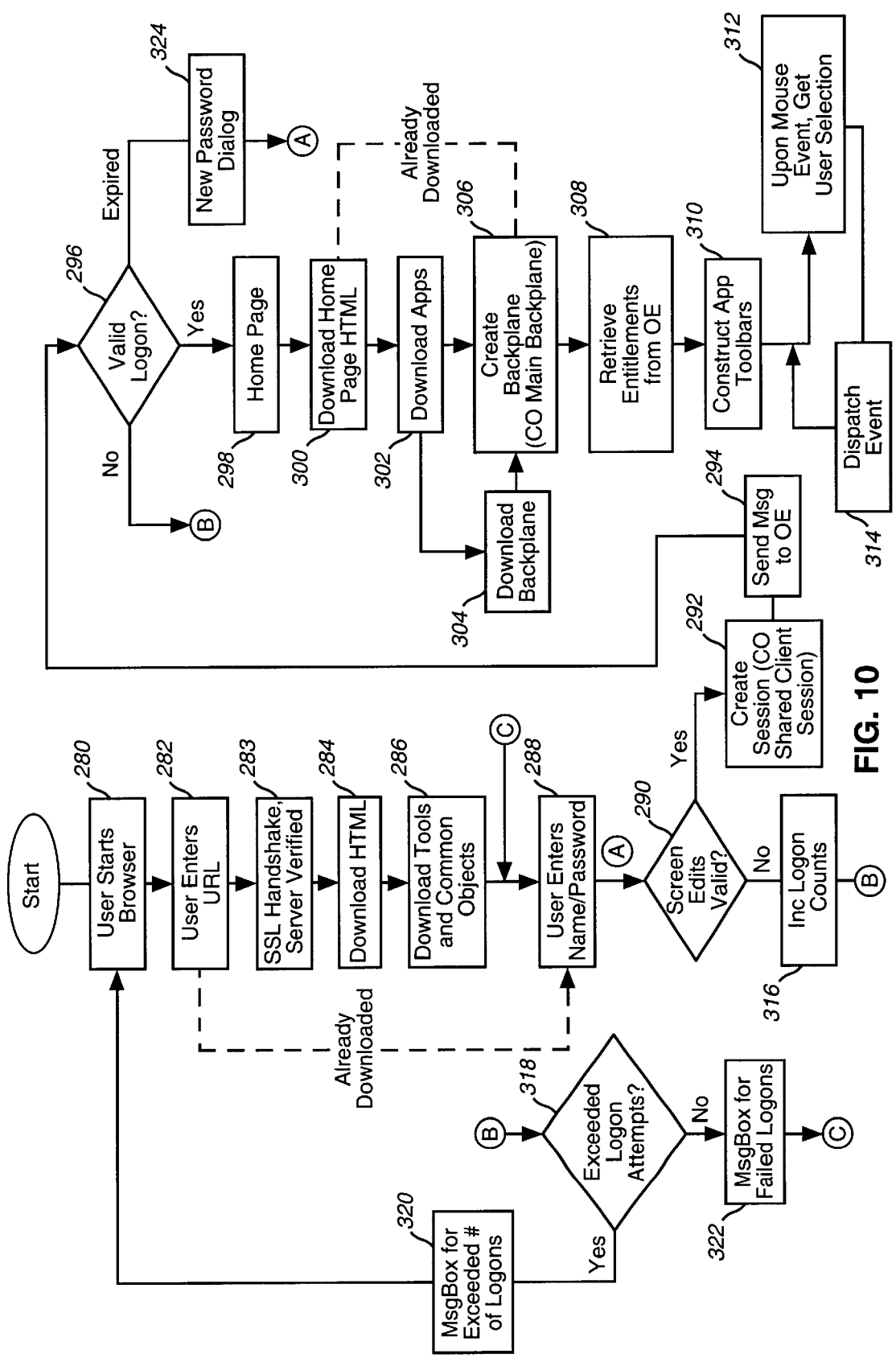
FIG. 10 is a flow diagram illustrating a logon process to the system of the present invention.

As illustrated in FIG. 10, the process starts with the browser launch as indicated at step 280, and the entry of the enterprise URL, such as HTTPS://www.enterprise.com as indicated at step 282. Following a successful connection, the SSL handshake protocol is initiated as indicated at step 283. When a SSL client and server first start communicating, they agree on a protocol version, select cryptographic algorithms, authenticate the server (or optionally authenticate each other) and use public-key encryption techniques to generate shared secrets. These processes are performed in the handshake protocol, which can be summarized as follows: The client sends a client hello message to which the server must respond with a server hello message, or else a fatal error will occur and the connection will fail. The client hello and server hello are used to establish security enhancement capabilities between client and server. The client hello and server hello establish the following attributes: Protocol Version, Session ID, Cipher Suite, and Compression Method. Additionally, two random values are generated and exchanged: ClientHello.random and ServerHello.random.

Following the hello messages, the server will send its digital certificate. Alternately, a server key exchange message may be sent, if it is required (e.g. if their server has no certificate, or if its certificate is for signing only). Once the server is authenticated, it may optionally request a certificate from the client, if that is appropriate to the cipher suite selected.

The server will then send the server hello done message, indicating that the hello-message phase of the handshake is complete. The server will then wait for a client response. If the server has sent a certificate request Message, the client must send either the certificate message or a no_certificate alert. The client key exchange message is now sent, and the content of that message will depend on the public key algorithm selected between the client hello and the server hello. If the client has sent a certificate with signing ability, a digitally-signed certificate verify message is sent to explicitly verify the certificate.

At this point, a change cipher spec message is sent by the client, and the client copies the pending Cipher Spec into the current Cipher Spec. The client then immediately sends the finished message under the new algorithms, keys, and secrets. In response, the server will send its own change cipher spec message, transfer the pending to the current Cipher Spec, and send its finished message under the new Cipher Spec. At this point, the handshake is complete and the client and server may begin to exchange user layer data.

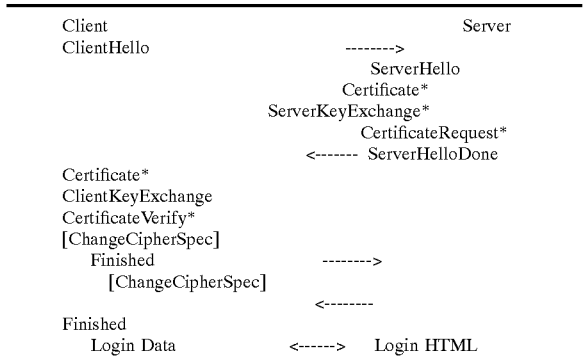

*Indicates optional or situation-dependent messages that are not always sent.

Figure 8:
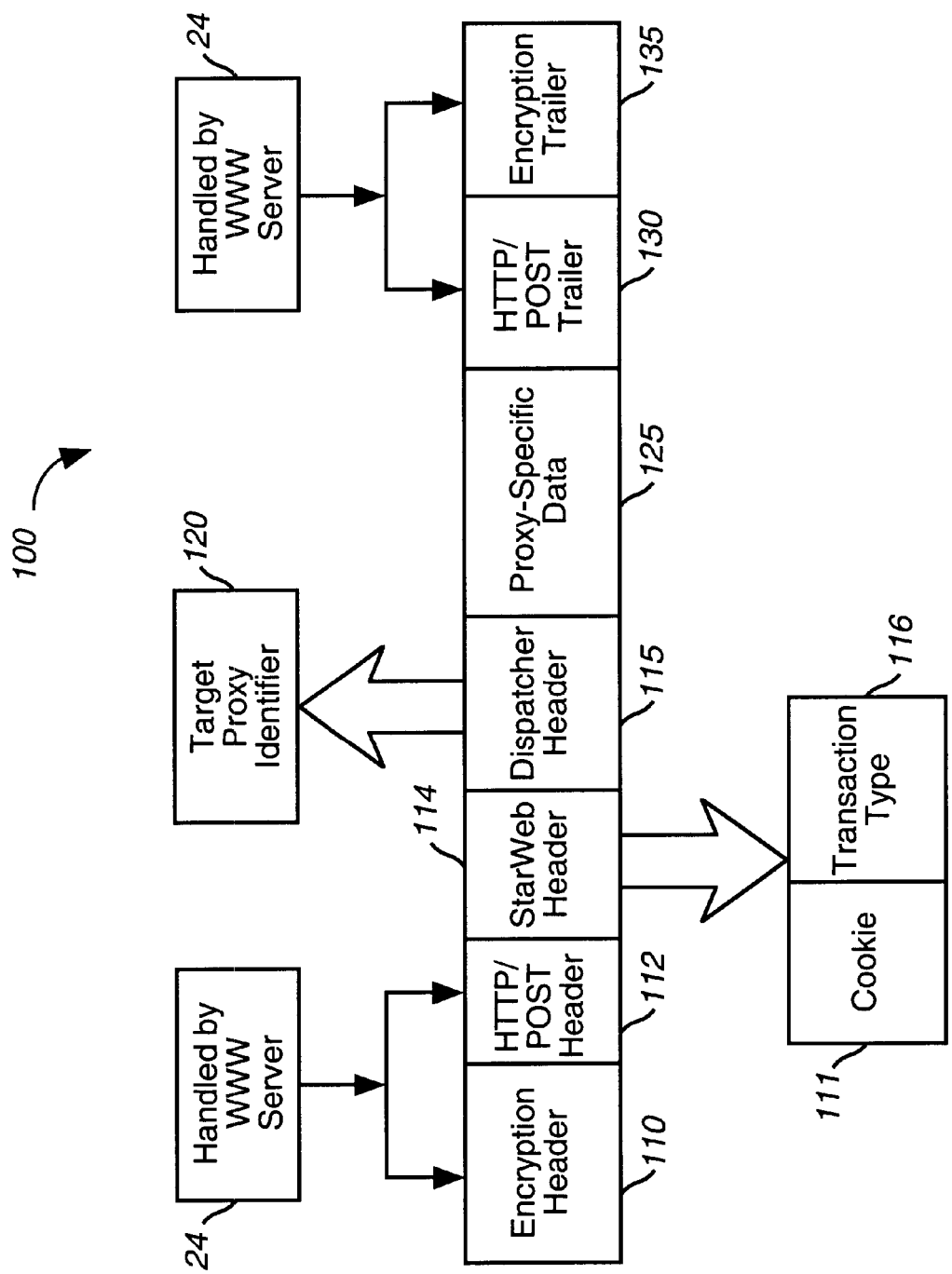
FIG. 8 is a schematic illustration of the message format passed from the user workstation 10 to the secure web server 24 over the public internet.

FIG. 8 is a schematic illustration of a logical message format sent from the client browser to the desired middle tier server for a particular application.

Figure 5:
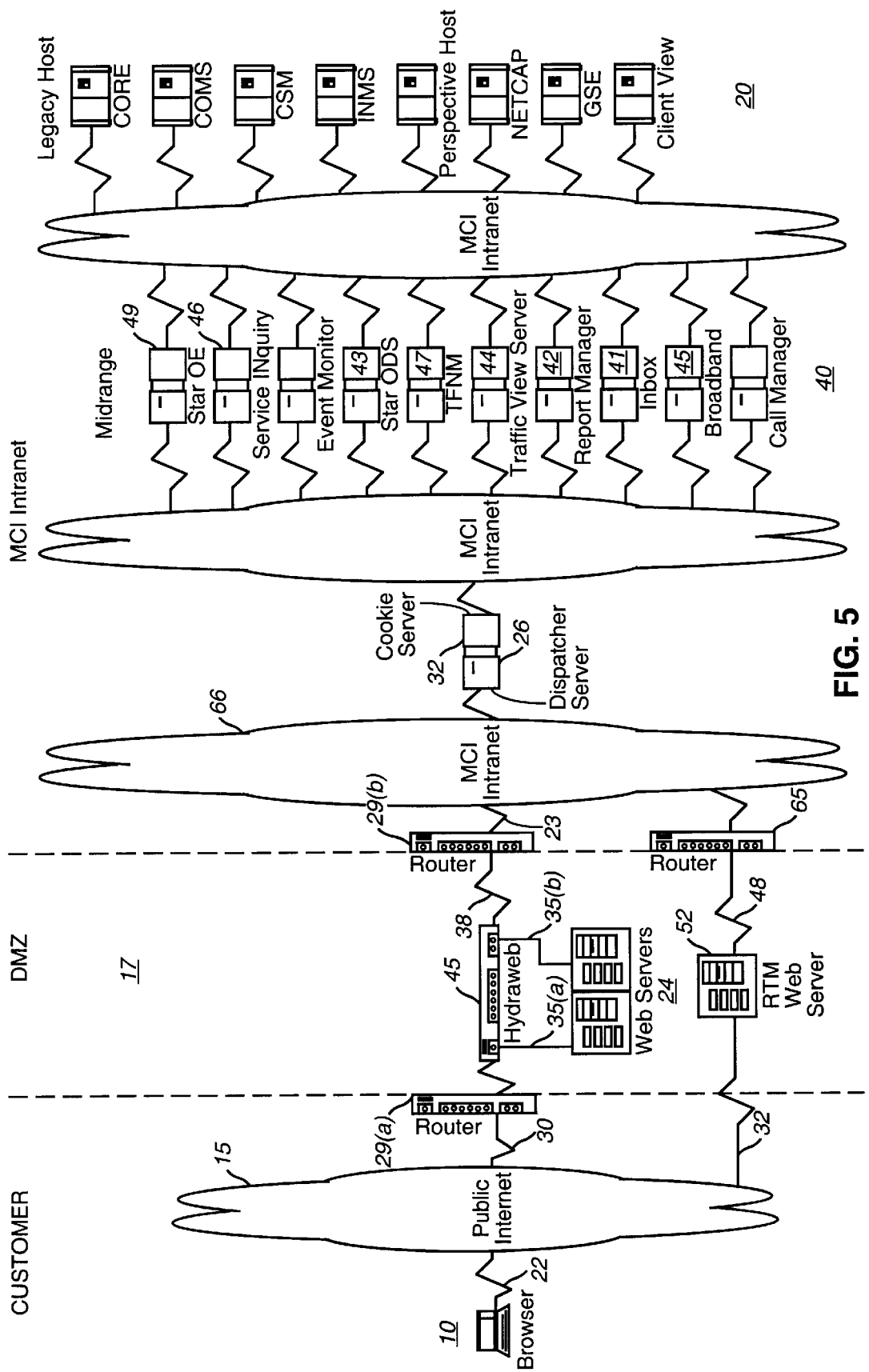
FIG. 5 is a diagram depicting the physical network architecture in the system of the present invention.

As mentioned herein with respect to FIG. 4, the messages created by the client Java software are transmitted to the secure Web Servers 24 over HTTPS. For incoming (client-to-server) communications, the Secure Web servers 24 decrypt a request, authenticate and verify the session information. The logical message format from the client to the Web server is shown as follows:

```
|| TCP/IP || encryption || http || web header ||
dispatcher header || proxy-specific data ||
``` where "||" separates a logical protocol level, and protocols nested from left to right. FIG. 8 illustrates a specific message sent from the client browser to the desired middle tier server for the particular application. As shown in FIG. 8, the client message 100 includes an SSL encryption header 110 and a network-level protocol HTTP/POST header 112 which are decrypted by the Secure web Server(s) 24 to access the underlying message; a DMZ Web header 114 which is used to generate a cookie 111 and transaction type identifier 116 for managing the client/server session; a dispatcher header 115 which includes the target proxy identifier 120 associated with the particular type of transaction requested; proxy specific data 125 including the application specific metadata utilized by the target proxy to form the particular messages for the particular middle tier server providing a service; and, the network-level HTTP/POST trailer 130 and encryption trailer 135 which are also decrypted by the secure DMZ Web server 24. Alternately, as illustrated in FIG. 5, an alternate message format may be used, as for example between the client workstation 10 and the R™ web server 52.

Referring to FIG. 4, after establishing that the request has come from a valid user and mapping the request to its associated session, the request is then forwarded through the firewall 29b over a socket connection 23 to one or more decode/dispatcher servers 26 located within the corporate Intranet 30. The messaging sent to the Dispatcher Server 26 will include the user identifier and session information, the target proxy identifier, and the proxy specific data. The decode/dispatcher server 26 then authenticates the user's access to the desired middle-tier service from cached data previously received from the StarOE server as will be hereinafter described in greater detail in connection with User Identification and Authentication.

As shown in FIG. 4, the Secure Web server 24 forwards the Dispatcher header and proxy-specific data to the Dispatcher Server 26 "enriched" with the identity of the user (and any other session-related information) as provided by the session data/cookie mapping, the target proxy identifier and the proxy-specific data. The dispatcher server 26 receives the requests forwarded by the Secure Web server(s) 24 and dispatches them to the appropriate application server or its proxy. The message wrappers are examined, revealing the user and the target middle-tier service for the request. A first-level validation is performed, making sure that the user is entitled to communicate with the desired service. The user's entitlements in this regard are fetched by the dispatcher server from StarOE server 217 at logon time and cached. Assuming that the Requestor is authorized to communicate with the target service, the message is then forwarded to the desired service's proxy. Each of these proxy processes may perform a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatcher server as a response to the request.

It should be understood that the application server proxies can either reside on the dispatcher server 26 itself, or, preferably, can be resident on the middle-tier application server, i.e., the dispatcher front end code can locate proxies resident on other servers.

User Identification and Authentication

Figure 6:
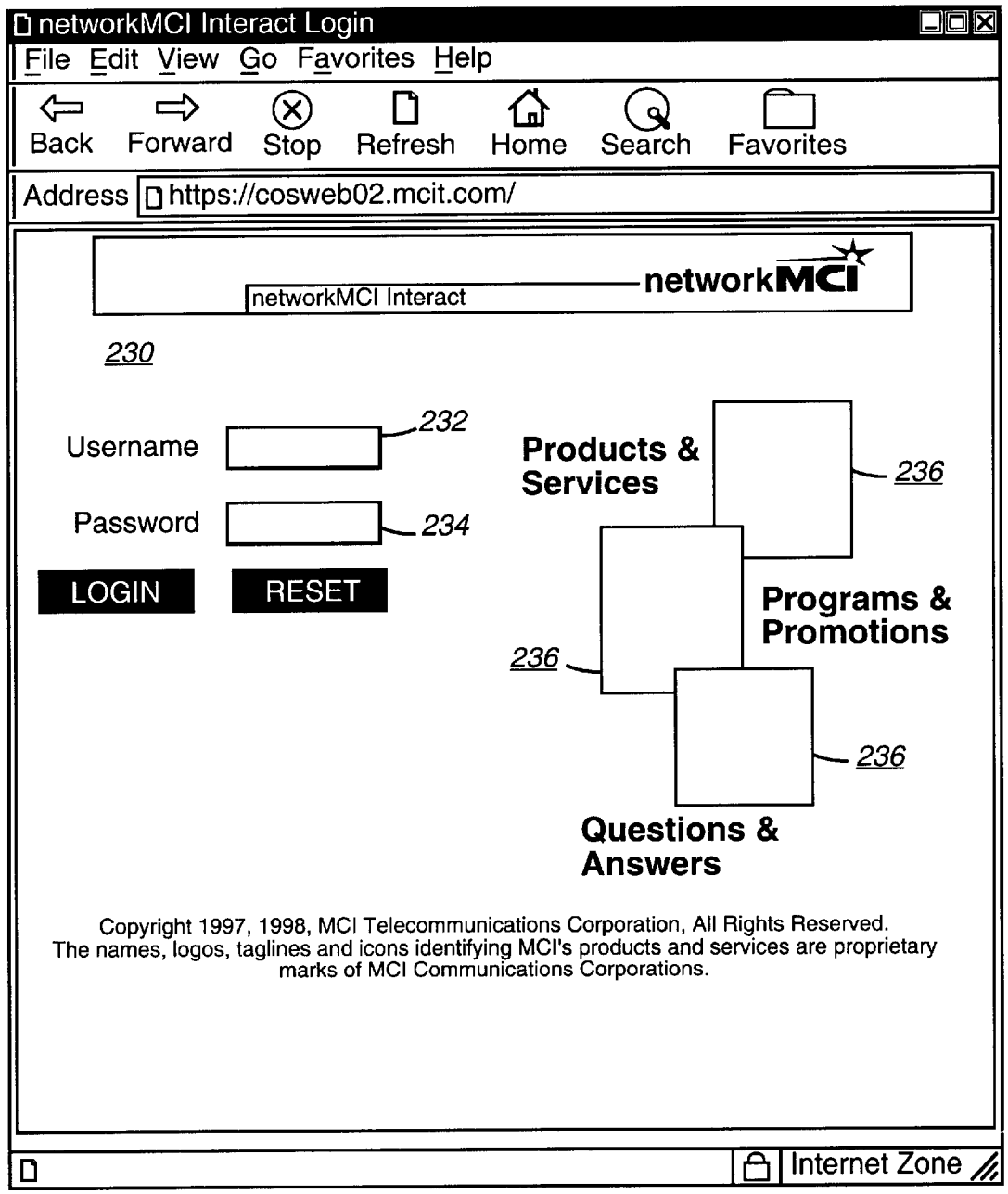
FIG. 6 is an example illustrating a logon Web page of the present invention.

FIG. 6 is an illustrative example of a logon Web page of the present invention. At the time of logon, the SSL protocol handshake has been completed, and the logon object and the HTML logon page 230 are the first items to be downloaded. Typically the logon page includes name 232 and password 234 fields for user to enter. The logon page 230, in addition, may include hyper links 236 to other services such as product and service center, programs and promotions, and questions and answers concerning the system of the present invention.

In the preferred embodiment, the invention uses a browser such as the Microsoft Explorer™ versions 4.01 or higher as the default browser for access and Java object distribution. The present invention provides an additional COSecurity module which is downloaded with the logon page and wraps the security functionality of specific browsers available off-the-shelf.

Downloading the Java objects presents a problem for the enterprise, since Netscape Communicator™, Microsoft Explorer™ and Sun's HotJava™ employ different techniques for downloading Java applets and classes, and it must be determined which browser the user is using before downloading the Java objects and classes.

The browser type is also communicated to assist the enterprise in determining how the Java common objects should be downloaded. Netscape Communicator™ and HotJava™ download Java objects in one or more JAR files, while Microsoft Explorer presently uses CAB files for the same purpose. Microsoft CAB (cabinet) files are equivalent to JAR files. The CAB files are used in the preferred embodiment of the invention for two reasons. First, for convenience in downloading class files so that they are locally resident on the PC. The browser tools, common objects and application class files are zipped up and downloaded to the java trusted library directory. Only trusted, i.e. signed, applets can make use of these class files. Secondly, signing an applet and obtaining permission from the user, enables the Java objects to break out of the "sandbox" and get around Java security restrictions, and enable local disk and file access and system I/O such as printing. Signed applets enable the user to verify the applets as being from a trusted source and allow applets to write to the local disk, print, read local files, and connect to a server other than the one that launches the applet. In order for an applet to be signed, the applet requires a digital certificate to be assigned to a JAR (Java ARchive) or equivalent archive file. As discussed previously, this digital certificate may be a software publisher certificate or the certificate used to verify the server as a trusted server during the SSL handshake process.

Figure 7:
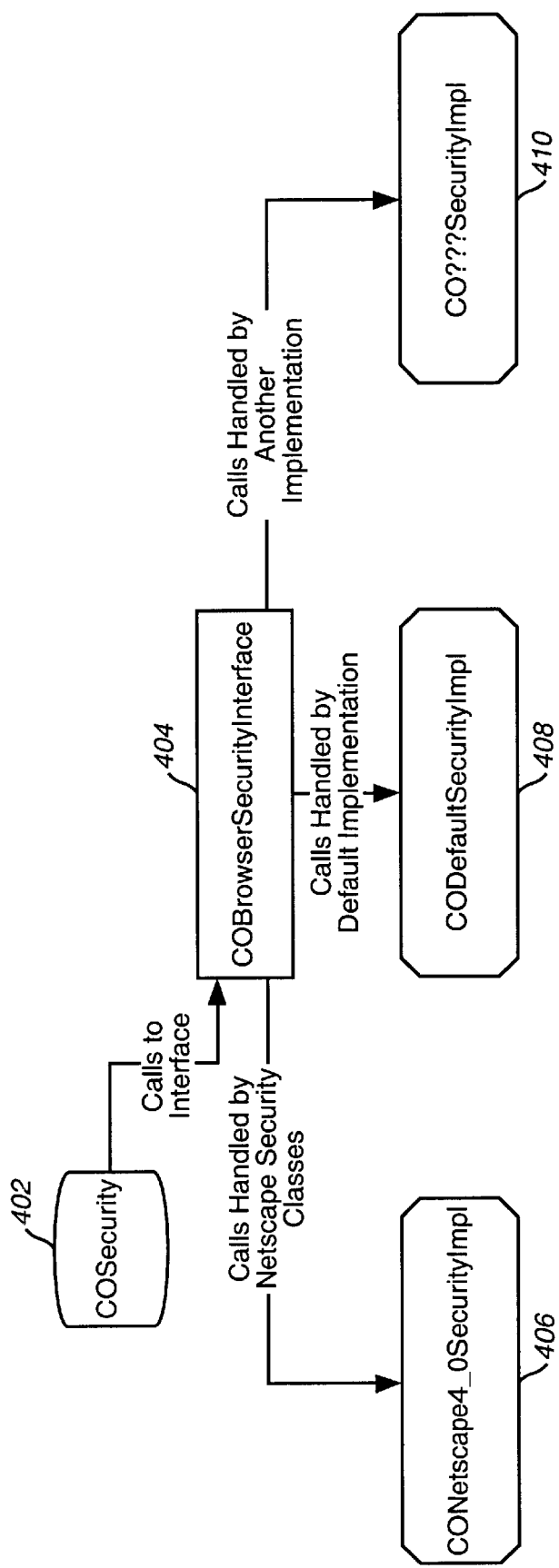
FIG. 7 is a diagram illustrating a security module design having clean separation from the browser specific implementations.

FIG. 7 is a diagram which illustrates a security module design having clean separation from the browser specific implementations. The security module includes the main COSecurity class 402, and the interface COBrowserSecurityInterface 404. The COSecurity object checks browser type upon instantiation. It does so by requesting the "java.vendor" system property. In the preferred embodiment of the invention, Microsoft Internet Explorer™ is the default browser, but if the browser is Netscape, for example, the class then instantiates by name the concrete implementation of the Netscape security interface, nmco.security.securityimpls. CONetscape4_0SecurityImpl 406. Otherwise, it instantiates nmco.security.securityimpls. CODefaultSecurityImpl 408.

The COBrowserSecurityInterface 404 mirrors the methods provided by COSecurity 402. Concrete implementations such as CONetscape4_0SecurityImpl 406 for Netscape Communicator and CODefaultSecurityImpl 408 as a default are also provided. Adding a new implementation 410 is as easy as implementing the COBrowserSecurityInterface, and adding in a new hook in COSecurity.

After using "java.vendor" to discover what browser is being used, COSecurity 402 instantiates by name the appropriate concrete implementation. This is done by class loading first, then using Class.newInstance( ) to create a new instance. The newInstance( ) method returns a generic object; in order to use it, it must be cast to the appropriate class. COSecurity 402 casts the instantiated object to COBrowserSecurityInterface 404, rather than to the concrete implementation. COSecurity 402 then makes calls to the COBrowserSecurityInterface "object," which is actually a concrete implementation "in disguise." This is an example of the use of object oriented polymorphism. This design cleanly separates the specific implementations which are browser-specific from the browser-independent COSecurity object.

Each COApp object may either create their own COSecurity object using the public constructors, or retrieve the COSecurity object used by the backplane via COBackPlane.getSecurity( ). In general, the developer of the applications to be run will use the COSecurity object whenever the COApp needs privileged access to any local resource, i.e., access to the local disk, printing, local system properties, and starting external processes. The following represents an example of the code generated when using the security object.

```
// Instantiating CoSecurity objectCOSecurity
security=new CoSecurity( );
// Now access a privileged resource
try {
    String s=
    security.getSystemProperty("user.home");
    System.out.println(s);
}
catch(COSecurityException cose)
{
    // take care in case of security exception
}
```

Referring back to FIG. 10, once the browser type has been confirmed, the logon applet checks for the name/password entry and instantiates a session object in step 292, communicating the name/password pair to the enterprise system. The session object sends a message containing the name/password to the StarOE server 49 for user validation in step 294.

When the user is properly authenticated by the server in step 296, another Web page which launches the backplane object is downloaded in steps 298, 300, 304. This page is referred to as a home page. At the same time, all the remaining application software objects are downloaded in CAB or JAR files as indicated at step 302. If the system of the present invention determines that the backplane and application files have been already downloaded, the steps 300, 302, 304 are not performed. The backplane object is then instantiated in step 306.

FIG. 4, as described previously, shows an example of a home page, typically a new Web page having the backplane object. The home page 60 is downloaded after the authentication via the logon page. The home page 60 comprises icons 70 for each of the application services as well as an application tool bar 254 for invoking the services. The application tool bar 254 is different from the icons 70 in that the application tool bar 254 remains on a screen, even when the home page 60 is no longer displayed. The home page also typically comprises HTML links to other services 256. These services may be new information center, features benefits, or a link 259 to the networkMCI Interact support center for the system of the present invention.

Referring again to FIG. 10, the backplane communicates with the StarOE server 49 to retrieve the user's entitlements in step 308. The entitlements represent specific services the user has subscribed and has privilege to access. It also describes what entitlements the user may have within any single service. For example, from the COUser context, the backplane can obtain the list of applications that the user is entitled to access. In addition, each COApp holds set of entitlements within that application in COAppEntitlements object.

Using the information from the COUser context, the backplane knows which COApps to provide, e.g., which buttons to install in its toolbar. The backplane stores the user specific entitlements in memory for other processes to access. After determining the entitlements, the backplane initiates a new thread and starts an application toolbar in step 310. The application toolbar includes the remote services to which the user has subscribed and may select to run. From the application toolbar, a user is able to select a service to run. Upon user selection, the selection is communicated from the application toolbar to the backplane in steps 312, 314, which then launches the graphical user interface program associated with the selected service. The application toolbar remains on the user display, even after a particular service has been initiated. This is useful when a user desires to start up another remote service directly from having run a previous service because the user then need not retrieve the home page again.

If it is determined that the user entered password is not valid in step 290 or step 296, an attempted logon count is incremented in step 316. If the user's attempted logon count is greater than a predefined allowed number of tries as indicated in step 318, a message is conveyed to the user in step 320 and the user must restart the browser. If the user's attempted logon count is not greater than the predefined allowed number of tries, a "failed login" message is conveyed to the user in step 322, and the user is prompted to reenter name/password in step 288. If it is determined that the user password has expired, the user is prompted to change the password in step 324. For example, the user may be required to change the password every 30 days for security reasons. Whenever the user changes the password, the new password is transmitted in real time to a server responsible for updating and keeping the password entry for the user. The user than enters the new password in step 324 and continues with the processing described above in step 290.

The present invention includes a user unit for representing a user of a current session. The user unit is generally implemented as a COUser class extending java.lang.Object. The COUser class object typically holds information including a user profile, applications and their entitlements. In order to minimize network traffic, the amount of data carried by the COUser is minimal initially, and becomes populated as requests are processed. The requests are generally processed by retrieving information from the Order Entry service. The profile information is then stored and populated in the COUser object should such information be requested again.

A COUser object is created when the user logs in, and holds the username and password of the user as an object in the COClientSession object. The session object is contained within the backplane, which manages the session throughout its lifetime. The code below Illustrates how this occurs:

// Within the backplane
COClientSession session=new COClientSession( );
try {
   Session.logon ("username", "password");
} catch (COClientLogonException e) { . . . };
// Should the User object be required
COUser user=session.getUsero;

The logon method of the COClientSession object communicates with the Order Entry server, a back-end authentication mechanism, for authenticating the user.

The COUser that may be obtained from the COClientSession immediately after the login process is very sparse. It includes a limited set of information such as username, a list of applications that user is entitled to, for example. The details of each entitlement information are retrieved at the time of actual processing with those information.

Session Security

As described previously, the SSL protocol includes one level of session security, and may negotiate and change in cipher code between sessions. Additionally, the present invention employs the "cookie" feature set of contemporary browsers to maintain session security, and prevent session hijacking or the use of a name and password obtained by sniffing, spoofing or EMR monitoring.

Figure 11:
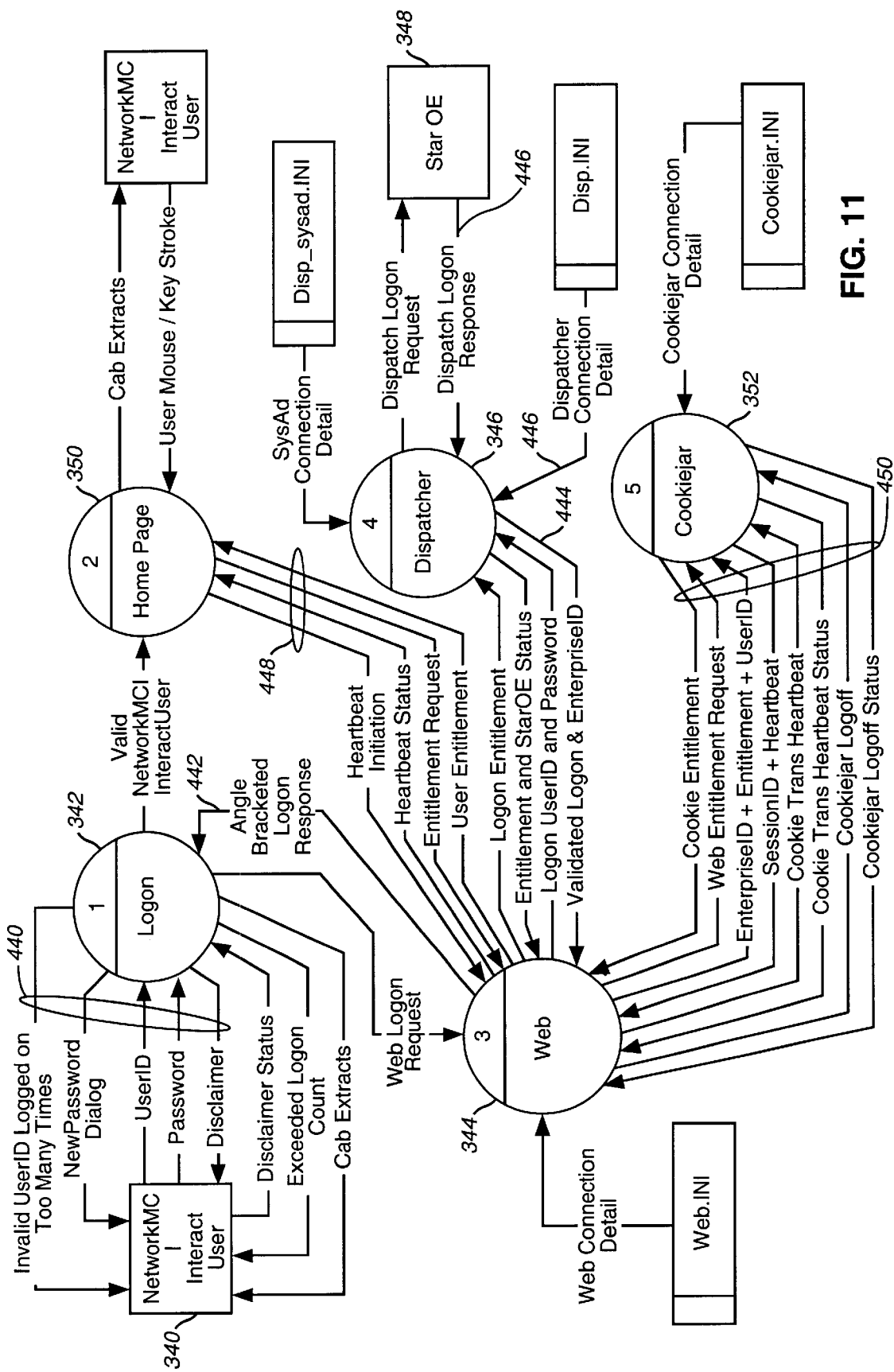
FIG. 11 is a data flow diagram illustrating the present invention's process flow during logon, entitlement request/response, heartbeat transmissions and logoff procedures.

FIG. 11 is a data flow diagram illustrating data flow among the processing modules of the "network MCI Interact" during logon, entitlement request/response, heartbeat transmissions and logoff procedures. As shown in FIG. 11, the client platform includes the networkMCI Interact user 340 representing a customer, a logon Web page having a logon object for logon processing 342, a home page having the backplane object. The Web server 344, the dispatcher server 346, cookie jar server 352, and StarOE server 348 are typically located at the enterprise site.

As described above, following the SSL handshake, certain cab files, class files and disclaimer requests are downloaded with the logon Web page as shown at 440. At the logon Web page, the customer 340 then enters a userid and password for user authentication as illustrated at 440. The customer also enters disclaimer acknowledgment 440 on the logon page 342. If the entered userid and password are not valid or if there were too many unsuccessful logon transactions, the logon object 342 communicates the appropriate message to the customer 340 as shown at 440. A logon object 342, typically an applet launched in the logon Web page connects to the Web server 344, for communicating a logon request to the system as shown at 442. The logon data, having an encrypted userid and password, is sent to the dispatcher 346 when the connection is established as shown at 444. The dispatcher 346 then decrypts the logon data and sends the data to the StarOE 348 after establishing a connection as shown at 446. The StarOE 348 validates the userid and password and sends the results back to the dispatcher 346 as illustrated at 446 together with the user application entitlements. The dispatcher 346 passes the data results obtained from the StarOE 348 to the Web server 344 as shown at 444, which passes the data back to the logon object 342 as shown at 442. The customer 340 is then notified of the logon results as shown as 440.

When the customer 340 is validated properly, the customer is presented with another Web page, referred to as the home page 350, from which the backplane is typically launched. After the user validation, the backplane generally manages the entire user session until the user logs off the "networkMCI Interact." As shown at 448, the backplane initiates a session heartbeat which is used to detect and keep the communications alive between the client platform and the enterprise Intranet site. The backplane also instantiates a COUser object for housekeeping of all client information as received from the StarOE 348. For example, to determine which applications a current customer is entitled to access and to activate only those application options on the home page for enabling the customer to select, the backplane sends a "get application list" message via the Web server 344 and the dispatcher 346 to the StarOE 348 as shown at 448, 444, and 446. The entitlement list for the customer is then sent from the StarOE 348 back to the dispatcher 346, to the Web server 344 and to the backplane at the home page 350 via the path shown at 446, 444, and 448. The application entitlements for the customer are kept in the COUser object for appropriate use by the backplane and for subsequent retrieval by the client applications.

The entitlement information for COUser is stored in a cookie jar 352, maintained in the cookie jar server 32 or the dispatcher server 26 (illustrated in FIGS. 4 and 5). When the Web server receives the entitlement requests from the backplane at the home page 350 or from any other client applications, the Web server 344 makes a connection to the cookie jar 352 and checks if the requested information is included in the cookie jar 352 as shown at 450. The cookie jar 352 is a repository for current customer sessions and the individual session details are included in a cookie including the entitlement information from the OE server 348. During the logon process described above, the OE server 348 may include in its response, the entitlements for the validated customer. The dispatcher 346 transfers the entitlement data to the Web server 344, which translates it into a binary format. The Web server 344 then transmits the binary entitlement data to the cookie jar 352 for storage and retrieval for the duration of a session. Accordingly, if the requested information can be located in the cookie jar 352, no further request to the StarOE 348 may be made. This mechanism cuts down on the response time in processing the request. Although the same information, for example, customer application entitlements or entitlements for corp ids, may be stored in the COUser object and maintained at the client platform as described above, a second check is usually made with the cookie jar 352 via the Web server 344 in order to insure against a corrupted or tampered COUser object's information. Thus, entitlements are typically checked in two places: the client platform 10 via COUser object and the Web server 344 via the cookie jar 352.

When a connection is established with the cookie jar 352, the Web server 344 makes a request for the entitlements for a given session as shown at 450. The cookie jar 352 goes through its stored list of cookies, identifies the cookie for the session and returns the cookie to the Web server 344 also shown at 450. The Web server 344 typically converts the entitlements which are received in binary format, to string representation of entitlements, and sends the entitlement string back to the backplane running on the client platform 10.

Furthermore, the cookie jar 352 is used to manage heartbeat transactions. Heartbeat transactions, as described above, are used to determine session continuity and to identify those processes which have died abnormally as a result of a process failure, system crash or a communications failure, for example. During a customer session initialization, the cookie jar 352 generates a session id and sets up "heartbeat"transactions for the customer's session. Subsequently, a heartbeat request is typically sent from a process running on a client platform to the Web server 344, when a connection is established, as shown at 448. The Web server 344 connects to the cookie jar 352 and requests heartbeat update for a given session. The cookie jar 352 searches its stored list of cookies, identifies the cookie for the session and updates the heartbeat time. The cookie jar 352 then sends the Web server 344 the updated status heartbeat as shown at 450. The Web server 344 then sends the status back to the client platform process, also as shown at 450.

When a customer wants to logoff, a logoff request transaction may be sent to the Web server 344. The Web server 344 then connects to the cookie jar 352 and requests logoff for the session as shown at 450. The cookie jar 352 identifies the cookie for the session and deletes the cookie. After deleting the cookie, the cookie jar 352 sends a logoff status to the Web server 344, which returns the status to the client platform.

Figure 12:
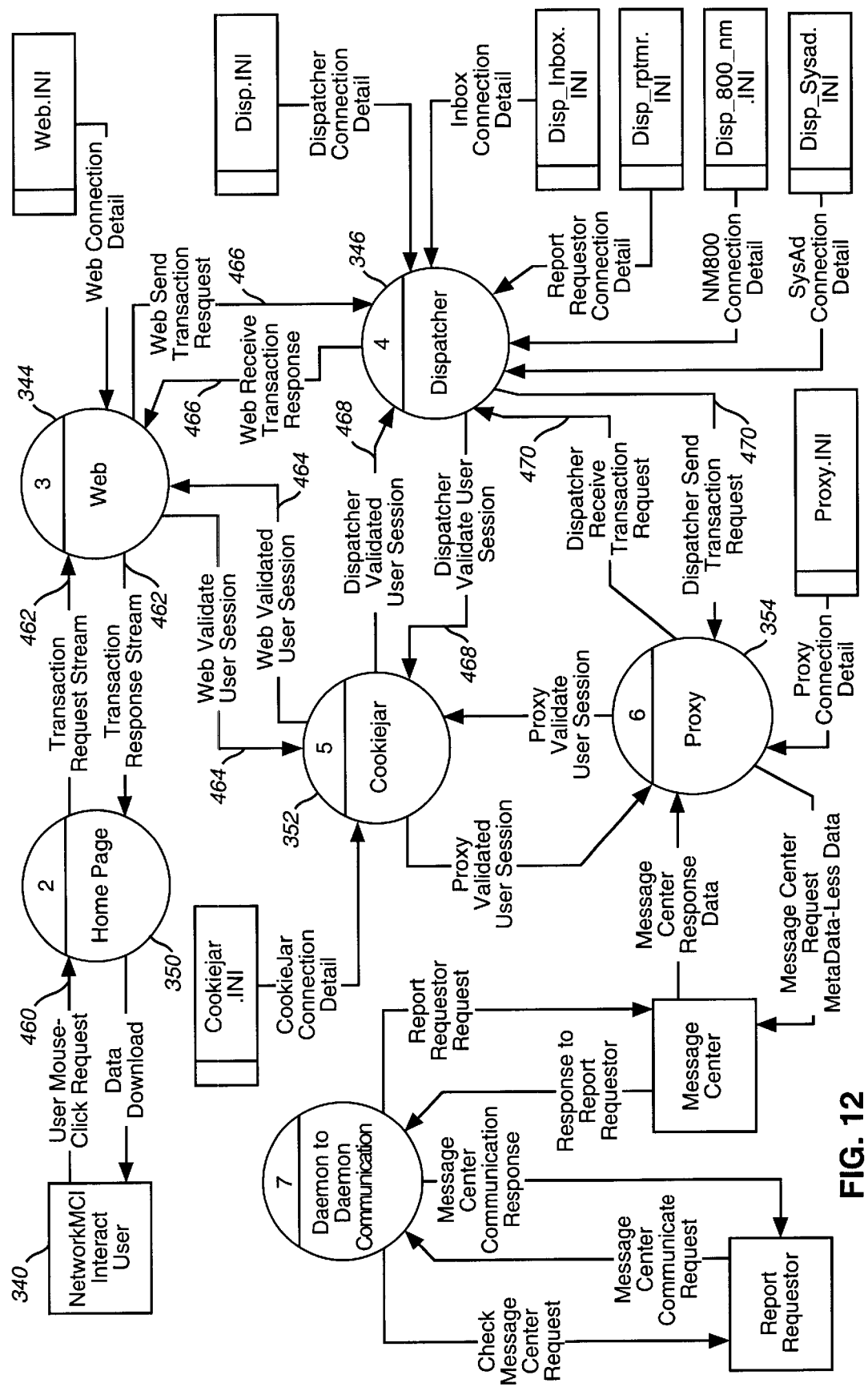
FIG. 12 is a data flow diagram for various transactions communicated in the system of the present invention.

Other transaction requests are also sent via the Web server 344 and the cookie jar 352 as shown in FIG. 12. FIG. 12 is a data flow diagram for various transactions communicated in the system of the present invention. Typically, when a customer enters a mouse click on an application link as shown at 460, an appropriate transaction request stream is sent to the Web server as shown at 462. The Web server 344 typically decrypts the transaction stream and connects to the cookie jar 352 to check if a given session is still valid as shown at 464. The cookie jar 352 identifies the cookie for the session and sends it back to the Web server 344 as shown at 464. The Web server 344 on receipt of valid session connects to the dispatcher 346 and sends the transaction request as shown at 466. When the dispatcher 346 obtains the request, it may also connect to the cookie jar 352 to validate the session as shown at 468. The cookie jar 352 identifies the cookie for the session and sends it back to the dispatcher 346 as shown at 468. The dispatcher 346, upon receiving the valid session connects to a targeted application server or proxy 354, which may include StarOE, and sends the request transaction to the target as shown at 470. The server or proxy 354 processes the request and sends back the response as stream of data which is piped back to the dispatcher 346 as shown at 470. The dispatcher 346 pipes the data back to the Web server 344 as shown at 466, which encrypts and pipes the data to the client platform as shown at 462, referred to as the home page 350 in FIG. 12.

The present invention includes a client communications unit for providing a single interface from which the backplane and the applications may send messages and requests to back-end services. The client communications unit includes a client session unit and a transactions unit. The client session unit and the transactions unit comprise classes used by client applications to create objects that handle communications to the various application proxies and/or servers. Generally, the entire communications processes start with the creation of a client session after a login process. This is started through the login process. The user logs into user's Web page with a username and password. During a login process, a client session object of class COClientSession is created, and the COClientSession object passes the username and password information pair obtained from the login process to a remote system administrative service which validates the pair. The following code instructions are implemented, for example, to start up a session using the COClientSession class. COClientSession ss=new COClientSession( );
  try {
    ss.setURL(urlString);
    ss.logon("jsmith", "myPassword");
  } catch (COClientLogonException e) { . . .
  } catch (MalformedURLException e) { . . . };
In addition, the COClientSession object includes a reference to a valid COUser object associated with the user of the current COClientSession object.

The client session object also provides a session, where a customer logs on to the system at the start of the session, and if successfully authenticated, is authorized to use the system until the session ends. The client session object at the same time provides a capability to maintain session-specific information for the life/duration of the session. Generally, communications to and from the client takes place over HTTPS which uses the HTTP protocols over an SSL encrypted channel. Each HTTP request/reply is a separate TCP/IP connection, completely independent of all previous or future connections between the same server and client. Because HTTP is stateless, meaning that each connection consists of a single request from the client which is answered by a single reply by a server, a novel method is provided to associate a given HTTP request with the logical session to which it belongs.

When a user is authenticated at login via the system administrative server, the client session object is given a session identifier or "cookie," a unique server-generated key which identifies a session. The session key is typically encapsulated in a class COWebCookie, "public COWebCookie (int value).", where value represents a given cookie's value. The client session object holds this key and returns it to the server as part of the subsequent HTTP request. The Web server maintains a "cookie jar" which is resident on the dispatcher server and which maps these keys to the associated session. This form of session management also functions as an additional authentication of each HTTPS request, adding security to the overall process. In the preferred embodiment, a single cookie typically suffices for the entire session. Alternately, a new cookie may be generated on each transaction for added security. Moreover, the cookie jar may be shared between the multiple physical servers in case of a failure of one server. This mechanism prevents sessions being dropped on a server failure.

In addition, to enable a server software to detect client sessions which have "died," e.g., the client session has been disconnected from the server without notice because of a client-side crash or network problem, the client application using the client session object "heartbeats" every predefined period, e.g., 1 minute, to the Web server to "renew" the session key (or record). The Web server in turn makes a heartbeat transaction request to the cookie jar. Upon receipt of the request, the cookie jar service "marks" the session record with a timestamp indicating the most recent time the client communicated to the server using the heartbeat. The cookie jar service also alarms itself, on a configurable period, to read through the cookie jar records (session keys) and check the timestamp (indicating the time at which the client was last heard) against the current time. If a session record's delta is greater than a predetermined amount of time, the cookie jar service clears the session record, effectively making a session key dead. Any subsequent transactions received with a dead session key, i.e., nonexistent in the cookie jar, are forbidden access through the Firewall.

The heartbeat messages are typically enabled by invoking the COClientSession object's method "public synchronized void enableSessionHeartbeat (boolean enableHeartbeat)," where enableHeartbeat is a flag to enable or disable heartbeat for a session. The heartbeat messages are typically transmitted periodically by first invoking the COClientSession object's method "public synchronized void setHeartbeatInterval (long millsecsInterval)," where the heartbeat interval is set in milliseconds, and by the COClientSession object's method "protected int startHeartbeat( )", where the heartbeat process starts as soon as the heartbeat interval is reached. Failure to "heartbeat" for consecutive predefined period, e.g., one hour, would result in the expiration of the session key.

Enterprise Security

Enterprise Security is directed to the security of the enterprise network and the data maintained by the various enterprise applications with respect to the open nature of the Internet, and the various attacks on the system or data likely to result from exposure to the Internet. Usual enterprise security is focused on internal procedures and employees, since this represents the biggest single area of exposure. Strong passwords, unique user Ids and the physical security of the workstations are applicable to both internal employees and external customers and users who will access the enterprise applications. It is noted that many of the previously described features relating to data encryption for communications security and session security are essential parts of enterprise security, and cooperate with enterprise architecture and software infrastructure to provide security for the enterprise.

For example, as will be hereinafter described in detail, the present invention uses strong symmetric key encryption for communications through the firewalls to the application servers. This internal symmetric key encryption, when coupled with external public key encryption provides an extra level of security for both the data and the software infrastructure.

FIG. 5 is a diagram depicting the physical networkMCI Interact system architecture 10. As shown in FIG. 5, the system is divided into three major architectural divisions including: 1) the customer workstation 10 which includes those mechanisms enabling customer connection to the Secure web servers 24; 2) a secure network area 17, known as the DeMilitarized Zone "DMZ" set aside on MCI premises double firewalled between the public Internet 25 and the MCI Intranet to prevent potentially hostile customer attacks; and, 3) the MCI Intranet Midrange Servers 40 and Legacy Mainframe Systems 20 which comprise the back end business logic applications.

As illustrated in FIG. 5, the present invention includes a double or complex firewall system that creates a "demilitarized zone" (DMZ) between two firewalls 29a, 29b.

In the preferred embodiment, a hybrid or complex gateway firewall system is used, and the firewalls 29(a),(b) of FIGS. 1, 4 and 5 are illustrative to represent the concept diagramatically. In the preferred embodiment, they may include port specific filtering routers, which may only connect with a designated port address. For example, router 29(a) may connect only to the addresses set for the HydraWeb® 45 (or web servers 24) within the DMZ, and router 29(b) may only connect to the port addresses set for the dispatcher server 26 within the network. In addition, the dispatcher server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet beyond the DMZ, thus ensuring internal company system security and integrity. Even with a stolen password, the hijacker may not connect to other ports, root directories or application servers within the enterprise system, and the only servers that may be sabotaged or controlled by a hacker are the web servers 24.

The DMZ acts as a double firewall for the enterprise intranet because of the double layer of port specific filtering rules. Further, the web servers 24 located in the DMZ never store or compute actual customer sensitive data. The web servers only transmit the data in a form suitable for display by the customer's web browser. Since the DMZ web servers do not store customer data, there is a much smaller chance of any customer information being jeopardized in case of a security breach. In the preferred embodiment, firewalls or routers 29(a),(b) are a combination of circuit gateways and filtering gateways or routers using packet filtering rules to grant or deny access from a source address to a destination address. All connections from the internal application servers are proxied and filtered through the dispatcher before reaching the web servers 24. Thus it appears to any remote site, that the connection is really with the DMZ site, and identity of the internal server is doubly obscured. This also prevents and direct connection between any external and any internal network or intranet computer.

The filtering firewalls 29(a),(b) may also pass or block specific types of Internet protocols. For example, FTP can be enabled only for connections to the In-Box server 41, and denied for all other destinations. SMTP can also be enabled to the In-Box server, but Telenet denied. The In-box server 41 is a store and forward server for client designated reports, but even in this server, the data and meta-data are separated to further secure the data.

As previously described, the customer access mechanism is a client workstation 10 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the present embodiment, the DMZ Secure Web servers 24 are DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available"server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 35a and generates the appropriate encrypted messages for routing the request to the appropriate MCI Intranet midrange web server over connection 35b, router 55 and connection 23. Via the Hydraweb unit 45, a TCP/IP connection 38 links the Secure Web server 24 with the MCI Intranet Dispatcher server 26.

Further as shown in the DMZ 17 is a second R™ server 52 having its own connection to the public Internet via a TCP/IP connection 32. As described in co-pending U.S. Patent Application INTEGRATED PROXY INTERFACE FOR WEB BASED TELECOMMUNICATIONS MANAGEMENT TOOLS, U.S. Ser. No. 09/159,516 (Attorney Docket 11045), the disclosure of which is incorporated herein by reference thereto, this server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes two routers: a first router 55 for routing encrypted subscriber messages from a Secure Web server 24 to the Dispatcher server 26 located inside the second firewall 29b; and, a second router 65 for routing encrypted subscriber messages from the RTM Web server 52 to the Dispatcher server 26 inside the second firewall. In the preferred embodiment, the routers are manufactured by Cisco Systems, Inc. Although not shown, each of the routers 55, 65 may additionally route signals through a series of other routers before eventually being routed to the nMCI Interact Dispatcher server 26. In operation, each of the Secure servers 24 function to decrypt the client message, presently via the SSL implementation, and unwrap the session key and verify the users session from the COUser object authenticated at Logon.

After establishing that the request has come from a valid user and mapping the request to its associated session, the Secure Web servers 24 will re-encrypt the request using public key or RSA encryption and forward it over a second secure socket connection 23 to the dispatcher server 26 inside the enterprise Intranet.

Figure 13A:
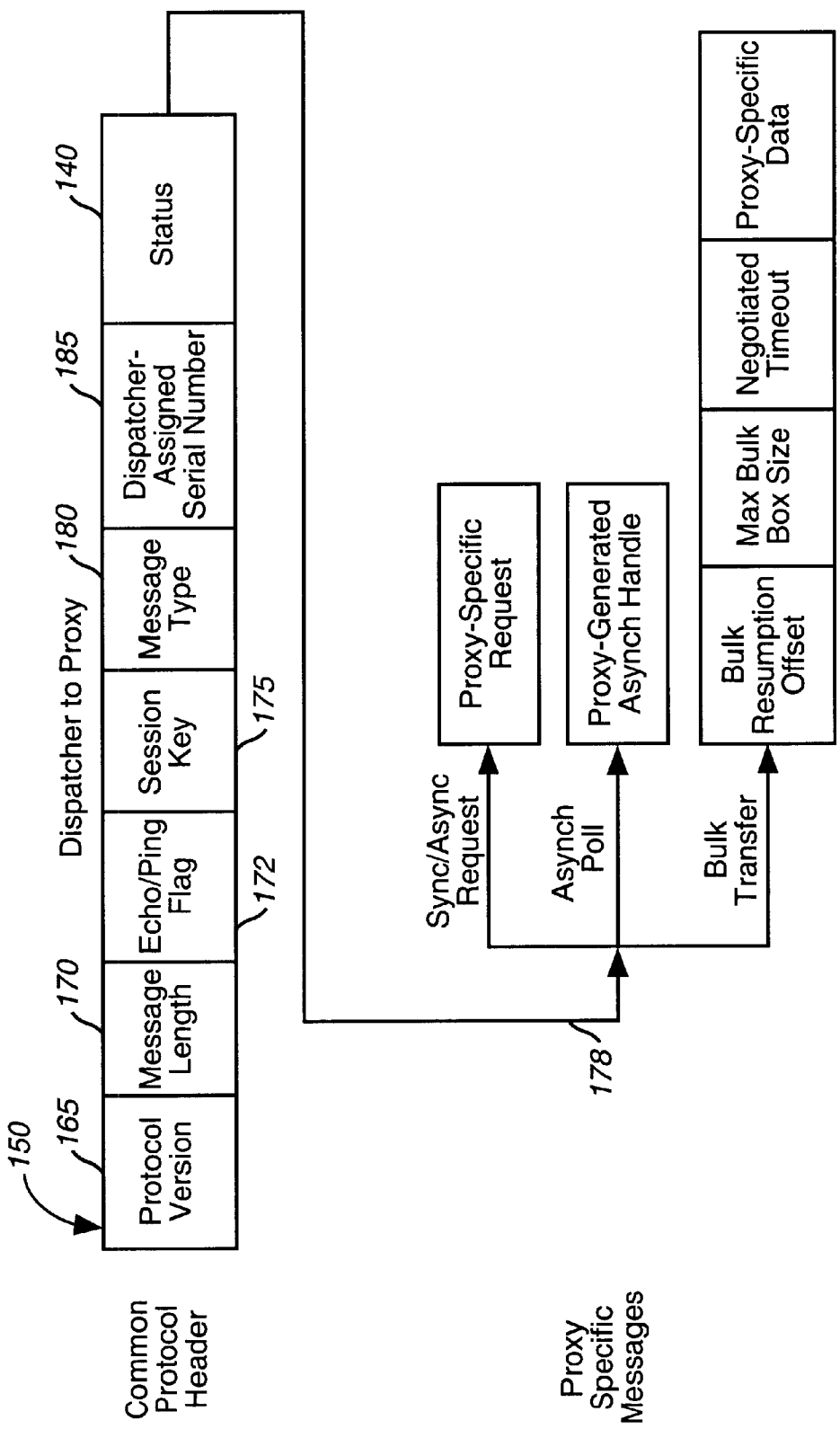
FIG. 13(a) is a schematic illustration showing the message format passed between the Dispatcher server and the application specific proxy.
Figure 13B:
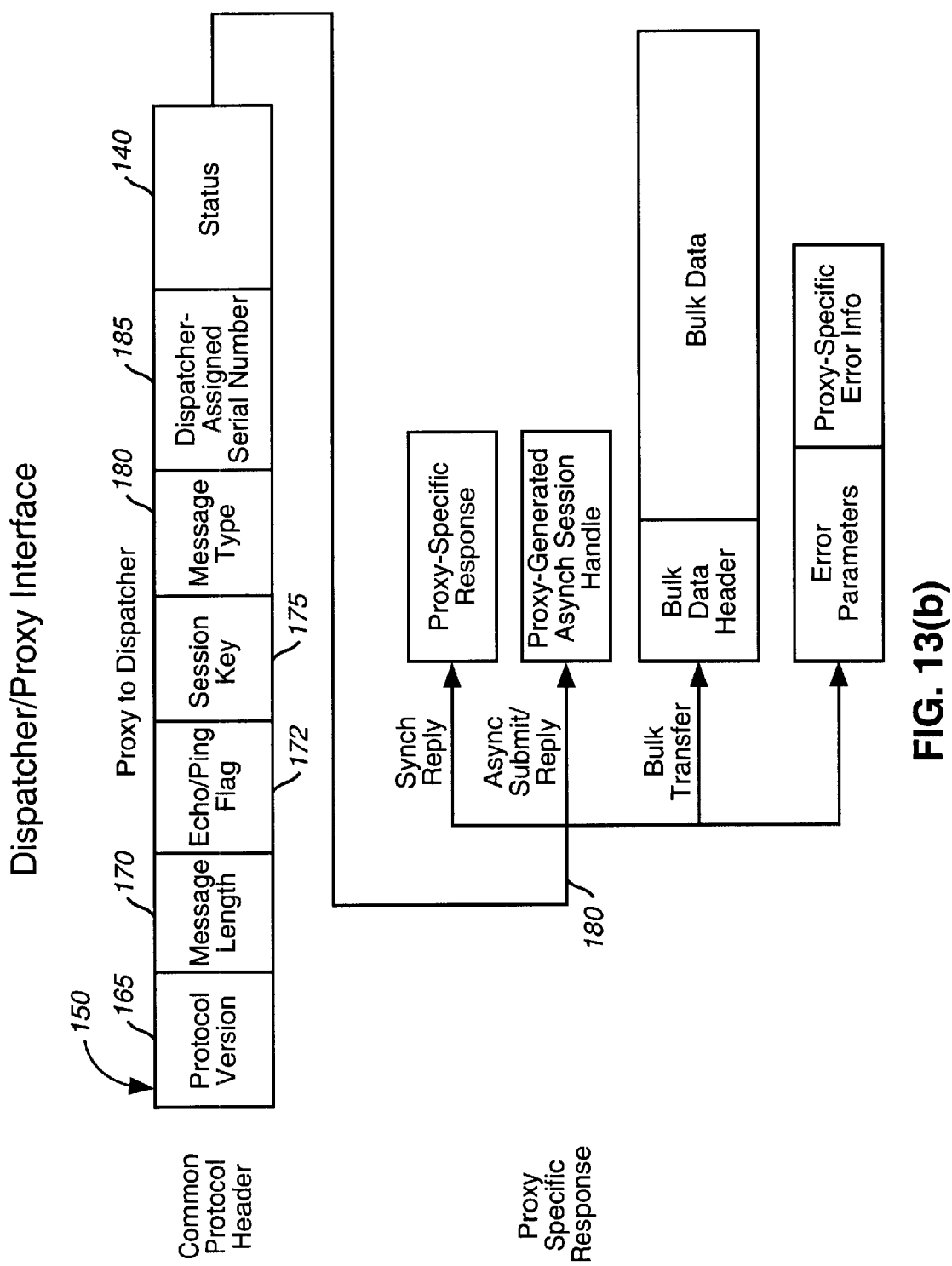
FIG. 13(b) is a schematic illustration of the message format passed between the application specific proxy back to the Dispatcher server.

FIG. 13(a) and 13(b) are schematic illustrations showing the message format passed between the dispatcher 26 and the relevant application specific proxy, (FIG. 13(a)) and the message format passed between the application specific proxy back to the Dispatcher 26 (FIG. 13(b)). As shown in FIG. 13(a), all messages between the Dispatcher and the Proxies, in both directions, begin with a common header 150 to allow leverage of common code for processing the messages. A first portion of the header includes the protocol version 165 which may comprise a byte of data for identifying version control for the protocol, i.e., the message format itself, and is intended to prevent undesired mismatches in versions of the dispatcher and proxies. The next portion includes the message length 170 which, preferably, is a 32-bit integer providing the total length of the message including all headers. Next is the echo/ping flag portion 172 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 175 which is the unique session key or "cookie" provided by the Web browser and used to uniquely identify the session at the browser. As described above, since the communications middleware is capable of supporting several types of transport mechanisms, the next portion of the common protocol header indicates the message type/mechanism 180 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 185 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 13(*a*), the proxy specific messages 178 are the metadata message requests from the report requester client and can be transmitted via synchronous, asynchronous or bulk transfer mechanisms. Likewise, the proxy specific responses are metadata response messages 180 again, capable of being transmitted via a synchronous, asynchronous or bulk transfer transport mechanism.

It should be understood that the application server proxies can either reside on the dispatcher server 26 itself, or, preferably, can be resident on the middle-tier application servers 40, i.e., the dispatcher front end code can locate proxies resident on other servers.

As mentioned, the proxy validation process includes parsing incoming requests, analyzing them, and confirming that they may include validly formatted messages for the service with acceptable parameters. If necessary, the message is translated into an underlying message or networking protocol. If no errors are found, the proxy then manages the communication with the middle-tier server to actually get the request serviced. The application proxy supports application specific translation and communication with the back-end application server for both the Web Server (java applet originated) messages and application server messages.

Particularly, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which includes the data to store. After a message is received, the parser object is created in the RMDispatcher.c object which is a file which includes the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket (theSocketType, thePortNum) and ServerSocket.C:: Socket (theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build"member function reads the string which includes the data to store and the class parses the string it receives. After a message has been received, the MCIInboxParser object is created in inboxutl.c which is a file which includes the functions which process the Inbox requests, i.e, Add, Delete, List, Fetch and Update. Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition, custom ESQL code for RM/database interface is provided which includes the ESQC C interface (Informix) stored procedures for performing the ARD, DRD, DUR, URS, GRD, CRD, and GPL messages. The functions call the stored procedures according to the message, and the response is built inside the functions depending on the returned values of the stored procedures. A mainsql.c program provides the ESQL C interface for messages from the report manager and report viewer.

Outgoing (server-to-client) communications follow the reverse route, i.e., the proxies feed responses to the decode/dispatcher server 26 and communicate them to the DMZ Web servers 24 over the socket connection. The Web servers 26 will forward the information to the client 10 using SSL. The logical message format returned to the client from the middle tier service is shown as follows:

|| TCP/IP || encryption || http || web response || dispatcher response || proxy-specific response || where "||" separates a logical protocol level, and protocols nested from left to right.

While the invention has been particularly shown and described with respect to preferred embodiments thereof, it will be understood by those skilled in the art that the foregoing and other changes in form and details may be made therein without departing from the spirit and scope of the invention.

We claim:

1. A security system for communications network management having an integrated customer interface, said security system comprising:

(a) a plurality of client web browsers to enable interactive secure communications with said system, each of said web browsers identified with a customer and providing an integrated interface for said customer, each of said web browsers supporting client identification, client authentication and secure sockets layer communications protocol;

(b) at least one secure web server for managing secure client sessions over the internet, said secure web server supporting secure socket layer for encrypted communication between said client browser and said secure web server, said secure server also providing session management including client identification, validation and session management to link said session with said client:

(c) at least one dispatcher server for communicating with said secure web server through a first firewall, and communicating with a plurality of proxy services and system resources using an internal network, said dispatcher server providing verification of system access after client entitlements have been verified;

(d) said plurality of system resources providing communications network management capabilities for said client, each of said system resources responsive to a request from one of said plurality of client browsers to generate client data o r instructions relating to said communications network.

2. The security system for communications network management as claimed in claim 1 wherein said system includes digital certificates to authenticate said secure server to said client web browser.

3. The security system for communications network management as claimed in claim 2 wherein said session management further includes web cookie generation at each instance of client identification to link a session with said client through a plurality of discrete client communications in said session to verify said client to said dispatcher server at each transmission in said session.

4. The security system for communications network management as claimed in claim 3 wherein said cookie is generated by a program on a separate server during an entitlements communications, after identification and authentication of the client.

5. The security system for communications network management as claimed in claim 4 wherein said client web browser secure socket layer encrypts client identification, authentication and said session management cookie during each transmission.

6. The security system for communications network management as claimed in claim 1 wherein said session cookies provide simultaneous session management for a plurality of system resource platforms.

7. The security system for communications network management as claimed in claim 1 wherein said secure web server communicates with said dispatcher server over an encrypted socket connection.

8. The security system for communications network management as claimed in claim 7 wherein said system includes encryption between said secure web server and said dispatcher server.

9. The security system for communications network management as claimed in claim 7 wherein said system includes a first encryption algorithm for transmission of all customer data between said secure web server and said client browser for transmission of all customer data between said secure web server and said dispatcher server and a second encryption algorithm.

10. The security system for communications network management as claimed in claim 1 wherein each client request from said web browser is encrypted with a public key provided by said communications network, and each of said client requests includes an encrypted client cookie for client authentication.

11. A system having an integrated and secure customer interface for communications network management, said system including a web browser for use on a client computer, and a secure web server having a system home page, said system comprising:
  (a) a client web browser for displaying said system log on and home pages,
  (b) at least one Java applet embedded in said home page to provide interactive sessions with said communications network, said sessions including client authentication, session authentication and transaction requests for said communications network,
  (c) an encryption layer between said browser and said secure server to provide encryption of each client session with a public key provided by said communications network, each session also including session authentication with a client cookie generated by said system, said session cookie being encrypted with said public key during transmission of each transaction request to said secure server;
  (d) at least one security firewall on either side of said secure server to prevent direct public access to said communications network.

12. The system for communications network management as claimed in claim 11, said communications network further including a plurality of application servers for receiving transaction requests from said secure server, said secure server encrypting each of said transaction requests with a public key algorithm before transmission to a selected one of said application servers.

13. The system for communications network management as claimed in claim 12, said system further including a dispatcher server for receiving transaction requests from said secure server, and dispatching said request to said selected one of said application servers.

14. The system for communications network management as claimed in claim 11, wherein said communications network includes a router based firewall between said secure server and said public Internet, and a proxy based firewall between said secure server and any one of said applications servers.

15. The system for communications network management as claimed in claim 11, wherein one of said Java applets is a user object, said object being populated with a first set of entitlement at log on, and a second set of entitlement during a session with a selected application sever.

16. The system for communications network management as claimed in claim 11, said communications network further including an authentication server which determines entitlement for said user object following authentication.

17. An integrated network system having a plurality of on-line system security functions for a plurality of disparate application servers and services over the public Internet, the network system comprising:
  a plurality of disparate application server platforms, each server platform having one or more transaction requesting nodes, each of the transaction requesting nodes generating a plurality of transaction requests;
  at least one client object resident in a customer platform, the client object having a user interface for enabling a customer to interact with one or more of the disparate application servers on the integrated network system, the client object also generating transaction requests in response to a customer selection;
  an administrative server platform, said administrative server platform having a security profile for each customer having access to said network system, said security profile having information associated with the customer;
  a first security module for encrypting transactions between said customer platform and said network system in accordance with a first security protocol;
  a second security module for encrypting transactions between within said network system with a second security protocol;
  a plurality of messaging objects for encapsulating the transaction requests and the transaction responses and communicating the transaction requests and the transaction responses between the client object, the security modules, and the transaction requesting nodes on the disparate application server platforms,
  whereby each of the transaction requesting nodes may obtain the security profile associated with the customer by transacting with the administrative server platform.

18. The integrated network system as claimed in claim 17, wherein the administrative server platform further includes a centralized database for storing and retrieving the security profile of each customer.

19. The integrated network system as claimed in claim 18, wherein the first security module for encrypting transactions between said customer platform and said network system encrypts said transmissions with a public key algorithm.

20. The integrated network system as claimed in claim 17, wherein the second security module for encrypting transactions between within said network system encrypts said transmissions with a public key algorithm, having a secret public key.

21. The integrated network system as claimed in claim 17 wherein said client object is populated with entitlements by both said administrative server and said disparate application server platforms.

22. A method for providing a secure communications session between a customer and an enterprise network over the public Internet, said method comprising:
    (a) authenticating a secure server to a customer's client browser over the Internet;
    (b) encrypting communications between said client browser and said secure server with a first security protocol;
    (c) authenticating said customer and a set of customer entitlement at log on with an authentication server;
    (d) encrypting communications within said network with a second security protocol;
    (e) creating a session management object at each log on to authenticate the customer's browser at each communication from the browser during the communications session.

23. The method for providing a secure communications session between a customer and an enterprise network over the public Internet as claimed in claim 22, said method further comprising the step of providing a plurality of application resources to said customer within said network.

24. The method for providing a secure communications session between a customer and an enterprise network over the public Internet as claimed in claim 23, wherein a digital certificate is used for the step of authenticating the secure server to the customer's client browser.

25. The method for providing a secure communications session between a customer and an enterprise network over the public Internet as claimed in claim 24, wherein said method further includes public key encryption for encrypting communications between the browser and the network.

26. The method for providing a secure communications session between a customer and an enterprise network over the public Internet as claimed in claim 25 which uses a negotiated SSL protocol to authenticate the secure server and encrypt communications between the customer's client browser and the secure server.

27. The method for providing a secure communications session between a customer and an enterprise network over the public Internet as claimed in claim 24, wherein said method further includes the step of downloading a collection of Java objects to said customer's client browser for session management following a successful log on, said method using a digital certificate to authenticate said Java objects to said customer.

28. The method for providing a secure communications session between a customer and an enterprise network over the public Internet as claimed in claim 22, wherein said method further includes the step of creating a user object at log on, and populating said user object with entitlement for said application resources obtained from a user database maintained within said enterprise network.

29. The method for providing a secure communications session between a customer and an enterprise network over the public Internet as claimed in claim 28, wherein said step of populating said user object with entitlement includes a second step of populating said user object as the user accesses one of said application resources maintained within said enterprise network.

30. The method for providing a secure communications session between a customer and an enterprise network over the public Internet as claimed in claim 22, wherein said step of creating a session object at log on includes the step of generating a session cookie for said customer's browser, and examining said cookie at each session transmission to maintain session security.

31. The method for providing a secure communications session between a customer and an enterprise network over the public Internet as claimed in claim 22, said method further comprising the steps of packet filtering communications between said customer's client browser and a secure server within said network.

32. The method for providing a secure communications session between a customer and an enterprise network over the public Internet as claimed in claim 31, said method further comprising the step of creating a proxy to filter communications between said secure server and an application resource within said network.

33. The method for providing a secure communications session between a customer and an enterprise network over the public Internet as claimed in claim 22, wherein public key encryption is used for said security protocol within said network.

34. The method for providing a secure communications session between a customer and an enterprise network over the public Internet as claimed in claim 22, wherein said method further includes the step of downloading a collection of Java objects to said customer's client browser for session management following a successful log on.

35. The method for providing a secure communications session between a customer and an enterprise network over the public Internet as claimed in claim 22, wherein said method further includes the step of embedding calls to Java applets in a log on page presented to said customer at log on.

36. The method for providing a secure communications session between a customer and an enterprise network over the public Internet as claimed in claim 22, wherein said method further includes the step of embedding calls to Java objects in a home page presented to said customer at log on, said objects providing interactive sessions with said enterprise network, said sessions including client authentication, session authentication and transaction requests for said enterprise network.

* * * * *